(12) United States Patent
Cao et al.

(10) Patent No.: US 11,490,425 B2
(45) Date of Patent: Nov. 1, 2022

(54) FLEXIBLE GRANT-FREE RESOURCE CONFIGURATION SIGNALING

(71) Applicant: Huawei Technologies Co., Ltd., Shenzhen (CN)

(72) Inventors: Yu Cao, Ottawa (CA); Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/851,209

(22) Filed: Apr. 17, 2020

(65) Prior Publication Data

US 2020/0245376 A1 Jul. 30, 2020

Related U.S. Application Data

(63) Continuation of application No. 15/868,657, filed on Jan. 11, 2018, now Pat. No. 10,645,730.

(Continued)

(51) Int. Cl.
*H04W 74/08* (2009.01)
*H04W 76/27* (2018.01)
(Continued)

(52) U.S. Cl.
CPC ..... *H04W 74/0833* (2013.01); *H04W 72/042* (2013.01); *H04W 72/14* (2013.01);
(Continued)

(58) Field of Classification Search
None
See application file for complete search history.

(56) References Cited

U.S. PATENT DOCUMENTS 9,750,056 B2 8/2017 Au et al.
9,775,141 B2 9/2017 Nimbalker et al.
(Continued)

FOREIGN PATENT DOCUMENTS

CN 101816133 A 8/2010
CN 102595605 A 7/2012
(Continued)

OTHER PUBLICATIONS

ZTE, "Consideration on SPS and grant-free", 3GPP TSG-RAN WG2 Meeting #99bis, R2-1710322, Oct. 9-13, 2017, 8 Pages, Prague, Czech Republic.
(Continued)

*Primary Examiner* — Lonnie V Sweet
(74) *Attorney, Agent, or Firm* — Slater Matsil, LLP

(57) ABSTRACT

An embodiment method for grant-free resource configuration comprises configuring a first type of grant-free resource, wherein the first type of grant-free resource is cell-specific and is configured using broadcast signaling, and wherein the first type of grant-free resource is accessible to a UE without further configuration; and configuring a second type of grant-free resource, wherein the second type of grant-free resource is UE-specific and is configured using a combination of broadcast signaling and unicast/multicast signaling, and wherein the second type of grant-free resource is accessible to a UE only after the unicast/multicast configuration.

19 Claims, 11 Drawing Sheets

Related U.S. Application Data

(60) Provisional application No. 62/482,671, filed on Apr. 6, 2017.

(51) Int. Cl.

| | | |
|---|---|---|
| *H04W 72/04* | (2009.01) | |
| *H04W 74/00* | (2009.01) | |
| *H04W 88/02* | (2009.01) | |
| *H04W 88/08* | (2009.01) | |
| *H04W 72/14* | (2009.01) | |

(52) U.S. Cl.
CPC .......... *H04W 76/27* (2018.02); *H04W 74/006* (2013.01); *H04W 88/02* (2013.01); *H04W 88/08* (2013.01)

(56) References Cited

U.S. PATENT DOCUMENTS

| | | | |
|---|---|---|---|
| 10,645,730 B2 * | 5/2020 | Cao | H04W 74/0833 |
| 2010/0254329 A1 | 10/2010 | Pan et al. | |
| 2010/0284363 A1 * | 11/2010 | Ahn | H04L 27/2621 370/330 |
| 2011/0250918 A1 * | 10/2011 | Jen | H04W 52/365 455/517 |
| 2012/0014330 A1 * | 1/2012 | Damnjanovic | H04L 5/003 370/329 |
| 2012/0057449 A1 * | 3/2012 | Takaoka | H04B 1/713 370/210 |
| 2013/0142098 A1 | 6/2013 | Kwon et al. | |
| 2014/0192767 A1 | 7/2014 | Au et al. | |
| 2014/0254544 A1 | 9/2014 | Kar Kin Au et al. | |
| 2014/0313997 A1 * | 10/2014 | Xu | H04W 72/0413 370/329 |
| 2015/0016377 A1 * | 1/2015 | Kim | H04L 5/001 370/329 |
| 2015/0257173 A1 | 9/2015 | You et al. | |
| 2015/0341922 A1 * | 11/2015 | Han | H04W 28/08 370/280 |
| 2016/0374089 A1 | 12/2016 | Kim et al. | |
| 2017/0019894 A1 * | 1/2017 | Nimbalker | H04L 5/0053 |
| 2017/0034845 A1 | 2/2017 | Liu et al. | |
| 2017/0111894 A1 * | 4/2017 | Chen | H04L 5/0048 |
| 2017/0202009 A1 * | 7/2017 | Kim | H04W 72/1284 |
| 2017/0214442 A1 * | 7/2017 | Chae | H04L 5/0091 |
| 2017/0215201 A1 * | 7/2017 | Kim | H04L 5/0051 |
| 2017/0367110 A1 | 12/2017 | Li et al. | |
| 2017/0367116 A1 | 12/2017 | Li et al. | |
| 2018/0042016 A1 | 2/2018 | Babaei et al. | |
| 2018/0092125 A1 | 3/2018 | Sun et al. | |
| 2018/0098360 A1 | 4/2018 | Vos et al. | |
| 2018/0124813 A1 | 5/2018 | Li et al. | |
| 2018/0139778 A1 | 5/2018 | Chou et al. | |
| 2018/0146402 A1 | 5/2018 | Seo et al. | |
| 2018/0146495 A1 | 5/2018 | Xu et al. | |
| 2018/0183551 A1 | 6/2018 | Chou et al. | |
| 2018/0199334 A1 | 7/2018 | Ying et al. | |
| 2019/0037442 A1 | 1/2019 | Yi et al. | |
| 2019/0116004 A1 | 4/2019 | Goto et al. | |
| 2019/0268924 A1 | 8/2019 | Kim et al. | |
| 2019/0320446 A1 | 10/2019 | Li et al. | |

FOREIGN PATENT DOCUMENTS

| | | |
|---|---|---|
| CN | 102668673 A | 9/2012 |
| CN | 104838713 A | 8/2015 |
| CN | 105284172 A | 1/2016 |
| CN | 105323858 A | 2/2016 |
| CN | 105338640 A | 2/2016 |
| CN | 106507486 A | 3/2017 |
| CN | 106507497 A | 3/2017 |
| CN | 106550439 A | 3/2017 |
| EP | 3340726 A1 | 6/2018 |
| EP | 3050369 B1 | 11/2018 |
| JP | 2020530701 A | 10/2020 |
| KR | 20120105458 A | 9/2012 |
| RU | 2522175 C2 | 7/2014 |
| WO | 2014135126 A1 | 9/2014 |
| WO | 2016032376 A1 | 3/2016 |
| WO | 2016167828 A1 | 10/2016 |
| WO | 2016171046 A1 | 10/2016 |
| WO | 2016182533 A1 | 11/2016 |
| WO | 2017011944 A1 | 1/2017 |
| WO | 2018090861 A1 | 5/2018 |

OTHER PUBLICATIONS

LG Electronics, "General procedures for grant-free/grant-based MA", 3GPP TSG RAN WG1 Meeting #86bis, R1-1609228, Oct. 10-14, 2016, 3 Pages, Lisbon, Portugal.

Nokia, et al., "Grant-free to grant-based switching for URLLC", 3GPP TSG-RAN WG1 #87, R1-1612253, Nov. 14-18, 2016, 3 Pages, Reno, USA.

Huawei, et al., "Discussion on grant-free transmission", 3GPP TSG RAN WG1 Meeting #86, R1-166095, Aug. 22-26, 2016, 5 Pages. Gothenburg, Sweden.

Huawei, et al., "The Retransmission and HARQ schemes for grant-free", 3GPP TSG RAN WG1, Meeting #86bis, R1-1608859, Oct. 10-14, 2016, 5 Pages, Lisbon, Portugal.

Huawei, et al., "Grant-free transmission for UL URLLC", 3GPP TSG RAN WG1 Meeting #88b, R1-1704222, Apr. 3-7, 2017, 7 Pages, Spokane, USA.

Huawei, et al., UL data transmission procedure with and without UL grant, 3GPP TSG RAN WG1 Meeting #90bis, R1-1717091, Oct. 9-13, 2017, 17 Pages, Prague, Czech Republic.

NTT DOCOMO, Multiplexing mechanism for eMBB and URLLC, 3GPP TSG RAN WG1 Meeting #86bis, R1-1610082, Oct. 10-14, 2016, 6 Pages, Lisbon, Portugal.

"Uplink Grant-Free Access for 5G mMtc", 3GPP TSG RAN WG1 Meeting #86bis R1-1609398, Oct. 2016, 4 pages, Lisbon, Portugal.

"Discussion on Retransmission Design for Grant-Free Based UL Transmission," 3GPP TSG RAN WG1 Meeting #86bis, R1-1609400, Oct. 2016, 3 pages, Lisbon, Portugal.

ZTE, et al., "Basic Grant-free Transmission for URLLC", 3GPP TSG RAN WG1 Meeting #88, R1-1701594, Feb. 13-17, 2017, 8 Pages, Athens, Greece.

Intel Corporation, "Support of link adaptation for UL grant-free NOMA schemes", 3GPP TSG-RAN WG1 #86bis, R1-1610374, Oct. 10-14, 2016, 4 Pages, Lisbon, Portugal.

Samsung, "On grant-free UL transmissions for URLLC", 3GPP TSG RAN WG1 Meeting #88, R1-1702996, Feb. 13-17, 2017, 3 Pages, Athens, Greece.

NEC, "Remaining issues on UL transmission without grant", 3GPP TSG-RAN WG1 Meeting #90bis, R1-1718230, Oct. 9-13, 2017, 6 Pages, Prague, Czech Republic.

NTT DOCOMO, Inc., "Summary of offline discussions on UL transmission without UL grant", 3GPP TSG RAN WG1 Meeting #90, R1-17xxxxxx, Aug. 21-25, 2017, 23 Pages, Prague, Czechia.

Samsung, "Discussion on NoMA related procedure", 3GPP TSG RAN WG1 Meeting #93, R1-1806753, May 21-25, 2018, 7 Pages, Busan, Korea Media Tek Inc., "On UL data transmission without grant design and configuration", 3GPP TSG RAN WG1 Meeting #91, R1-1719586, Nov. 27-Dec. 1, 2017, 7 Pages, Reno, USA.

* cited by examiner

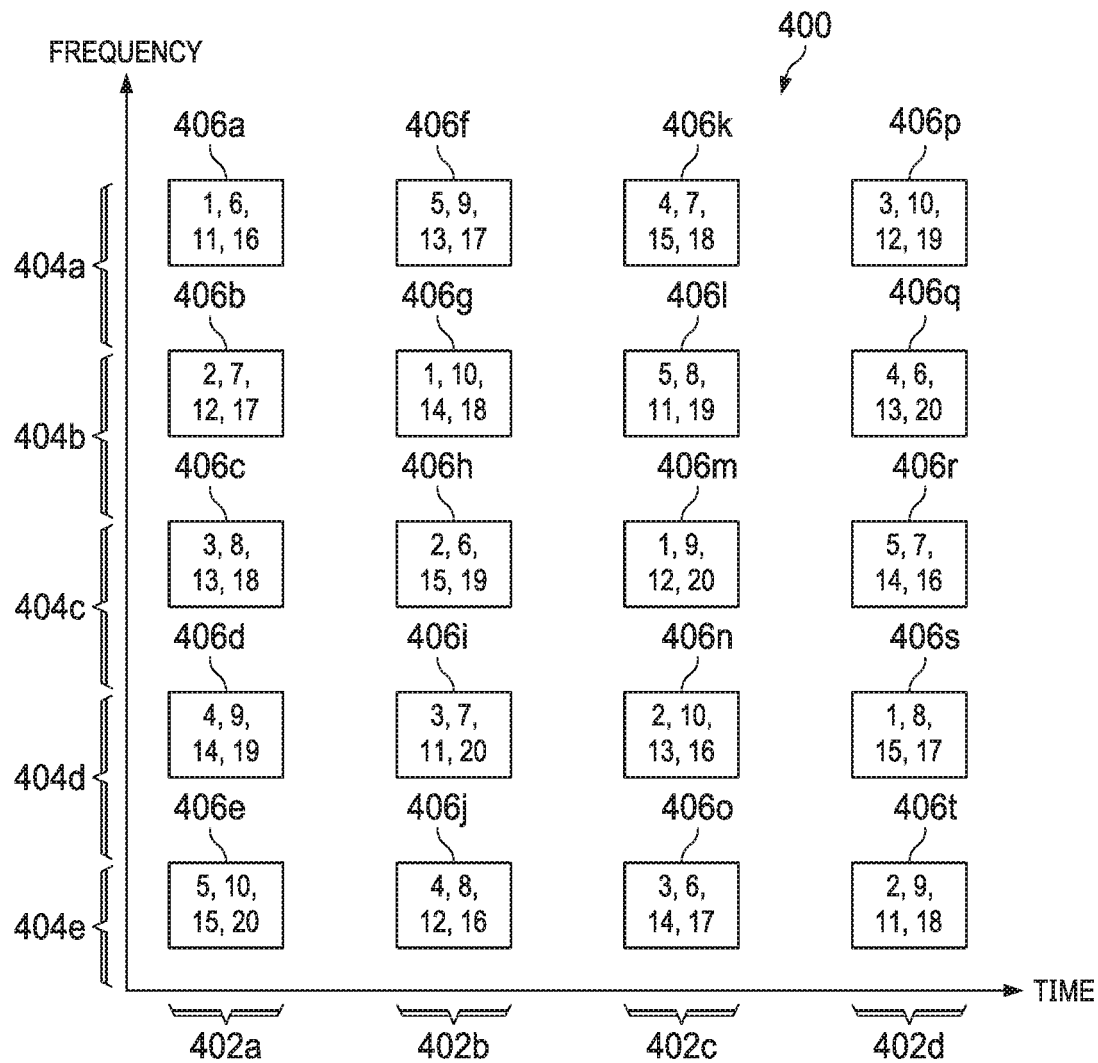
FIG. 4
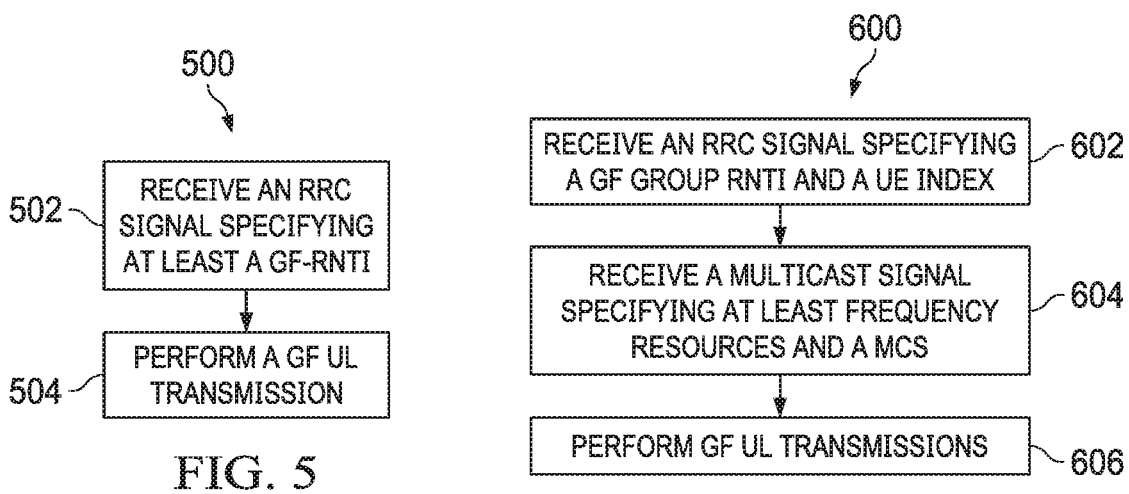
FIG. 5
FIG. 6

FLEXIBLE GRANT-FREE RESOURCE CONFIGURATION SIGNALING

This patent application is a continuation of U.S. patent application Ser. No. 15/868,657, filed on Jan. 11, 2018 and entitled "Flexible Grant-Free Resource Configuration Signaling," which claims priority to U.S. Provisional Application No. 62/482,671, filed on Apr. 6, 2017 and entitled "Flexible Grant-Free Resource Configuration Signaling with non-fixed CTU size," which applications are hereby incorporated by reference herein as if reproduced in their entireties.

TECHNICAL FIELD

The present invention relates generally to a system and method for wireless communications, and, in particular embodiments, to a system and method for grant-free resource configuration signaling with non-fixed transmission resources.

BACKGROUND

A user equipment (UE), a mobile station, or a similar component will be referred to herein as a UE. A UE may communicate on an uplink with a base station, an access point, an evolved node B (eNB), a gNB, a transmit/receive point, or a similar component. In some wireless networks, before the UE can transmit on the uplink, the UE needs to send a scheduling request (SR) to the base station requesting resources for the uplink transmission. Responsive to receiving the scheduling request, the base station may provide the UE with an uplink scheduling grant (SG) allocating the resources for the UE to use to transmit data on the uplink.

In some proposed wireless networks, uplink transmissions may occur in a grant-free manner. In the grant-free approach, uplink resources may be preconfigured for and allocated to multiple UEs without the UEs sending scheduling requests. When one of the UEs is ready to transmit on the uplink, the UE can immediately begin transmitting on the preconfigured resources without the need to ask for and receive an uplink scheduling grant. The grant-free approach may reduce signaling overhead and latency compared to the SR/uplink SG approach.

Grant-free uplink transmissions may be suitable for transmitting bursty traffic with short packets from UEs to a base station and/or for transmitting data to the base station in real time or with low latency. Examples of applications in which a grant-free uplink transmission scheme may be utilized include massive machine type communication (m-MTC), ultra-reliable low latency communications (URLLC), smart electric meters, teleprotection in smart grids, and autonomous driving. However, grant-free uplink transmission schemes are not limited to such applications.

SUMMARY

In some embodiments, a UE may receive a Radio Resource Control (RRC) signal. The RRC signal may specify at least one UE-specific GF radio network temporary identifier (GF-RNTI). The UE-specific GF-RNTI is different from a cell-RNTI (C-RNTI) for a grant-based initial transmission. The UE may perform the GF UL transmission without waiting for a downlink control information (DCI) signal.

In some embodiments, the UE may detect the DCI signal in a search space of a physical downlink control channel (PDCCH) using the GF-RNTI. The DCI signal may comprise information about a retransmission related to the GF transmission. The DCI signal may also comprise GF specific configuration parameters. The UE may detect the DCI signal in the search space of the PDCCH using the GF-RNTI by descrambling a cyclic redundancy check (CRC) of the DCI signal in accordance with the GF-RNTI and performing a CRC check of the DCI signal using the descrambled CRC.

The UE may perform the GF UL transmission in response to the receiving the RRC signal and before detection of the DCI signal. In some embodiments, before receiving the RRC, the UE may perform initial access by sending a preamble through a random access (RA) channel (RACH).

In some embodiments, a user equipment (UE) may receive a Radio Resource Control (RRC) signal. The RRC signal may specify a GF group Radio Network Temporary Identifier (RNTI) and a UE index. The GF group RNTI may be commonly shared by a group of UEs. The UE index may be assigned to the UE. Further, the UE index may be different from the UE indices assigned to other UEs in the group of UEs. The UE may receive a multicast signal. The multicast signal may specify at least frequency resources and Modulation and Coding Scheme (MCS) to be shared by the UEs in the group. In some embodiments, the multicast signal may be a group common downlink control information (DCI) signal addressed to the group of UEs sharing the GF group RNTI. The GF group RNTI may be used for scrambling a cyclic redundancy check (CRC) of the group common DCI. The UE may perform GF UL transmissions. The UE may perform GF UL transmissions in accordance with the GF group RNTI, the UE index, the frequency resources, and the MCS.

In some embodiments, the UE may determine a reference signal in accordance to the UE index. In those embodiments, the UE may perform the GF UL transmissions in accordance with the determined reference signal, the GF group RNTI, the frequency resources, and the MCS. The reference signal may be determined based on a currently configured reference signal, the UE index, and a total number of available reference signals.

In some embodiments, the UE may determine a hopping pattern based the UE index. The UE may perform the GF UL transmissions in accordance with the GF group RNTI, the UE index, the frequency resources, the MCS, and the determined hopping pattern. The determined hopping pattern of the UE may be different from hopping patterns of other UEs in the group of UEs.

In some embodiments, the UE may receive a UE-specific RRC signal. The UE specific RRC signal may specify a periodicity. The UE may perform the GF UL transmissions in accordance with the GF group RNTI, the UE index, the frequency resources, the MCS, and the periodicity.

In some embodiments, a user equipment (UE) may receive a UE-specific resource hopping pattern assigned to the UE. The UE-specific resource hopping pattern may comprise hopping information. The hopping information may be associated with a sub-band that the UE hops to at each corresponding time slot of a plurality of time slots. The UE may perform GF UL transmissions according to the UE-specific resource hopping pattern. In some embodiments, the sub-band that the UE hops to at each corresponding time slot may be determined based on the UE-specific cyclic shift value. In one embodiment, the sub-band that the UE hops to at each corresponding time slot may be determined based on the UE-specific cyclic shift value and an initial sub-band for the UE. In another embodiment, the sub-band that the UE hops to at each corresponding time slot may be determined based on a UE identifier. For example, the sub-band that the UE hops to at each corresponding time slot may be determined based on a UE-specific pseudo random sequence initialized by the UE identifier. In some embodiments, the UE identifier may be a UE-specific GF radio network temporary identifier (GF-RNTI). In yet another embodiment, the sub-band that the UE hops to at each corresponding time slot may be determined based on a UE-specific hopping index assigned to the UE.

In some embodiments, the hopping information may indicate the sub-band that the UE hops to at each corresponding time slot of the plurality of time slots. The hopping information may comprise a UE-specific cyclic shift value. The UE-specific cyclic shift value may indicate a number of sub-bands to be cyclically shifted by the UE from one time slot to a next time slot.

In some embodiments, the sub-band that the UE hops to at each corresponding time slot may be determined based on a UE-specific cyclic shift value derived from the UE-specific hopping index and an initial sub-band for the UE derived from the UE-specific hopping index. In some embodiments, the sub-band that the UE hops to at each corresponding time slot may be determined based on an identifier of a group of UEs. For example, the sub-band that the UE hops to at each corresponding time slot may be determined based on a group-specific pseudo random sequence initialized by the identifier of the group of UEs. In one embodiment, the identifier of the group of UEs may be a group Radio Network Temporary Identifier (RNTI). In another embodiment, the identifier of the group of UEs is determined based on a UE-specific hopping index.

In some embodiments, the UE may determine a reference signal based on a UE-specific hopping index.

In some embodiments, to perform the GF UL transmissions, the UE may determine a sub-band the UE hops to at a time slot based on the hopping information. Next, the UE may derive a physical resource block (PRB) index at the time slot in accordance with the determined sub-band, a total number of resource blocks (RBs) in the determined sub-band, and a total number of RBs assigned to the GF transmissions. Then, the UE may perform the GF UL transmissions at the time slot in accordance to the derived PRB index.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a diagram of an embodiment grouping of grant-free UEs into time and frequency resource groups;

FIG. 5 is an exemplary flowchart for grant-free (GF) transmissions;

FIG. 6 is an exemplary flowchart for grant-free (GF) uplink (UL) transmissions by a user equipment (UE) in a group of UEs;

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

When a group of UEs in the coverage area of a base station are operating in the grant-free mode, collisions may occur between two or more of the UEs. That is, two or more UEs may attempt to transmit using the same time and frequency resources, and the transmissions may thus be unsuccessful. Embodiments of the present disclosure provide techniques for reducing the likelihood of collisions.

The embodiments provide for flexible resource configuration and configuration of hopping by UEs from a first sub-band for a first transmission to a second sub-band for a second transmission. Resource configuration may be performed for one sub-frame and can be done for a flexible number of resource blocks. Grant-free resource regions are not predefined. Hopping pattern signaling may signal only the hopping after an initial transmission and may not include the initial location and size of the resources to be used. Simplified hopping signaling may use a single UE-specific cyclic shift value. UE-specific pseudo-random hopping may be used. That is, a random sequence for hopping may be initialized by a UE identifier instead of a cell identifier. The flexible resource size configuration allows simple signaling and flexible resource block assignment.

As such, the described techniques improve the network system with more efficient utilization of the network resources.

Figure 1:
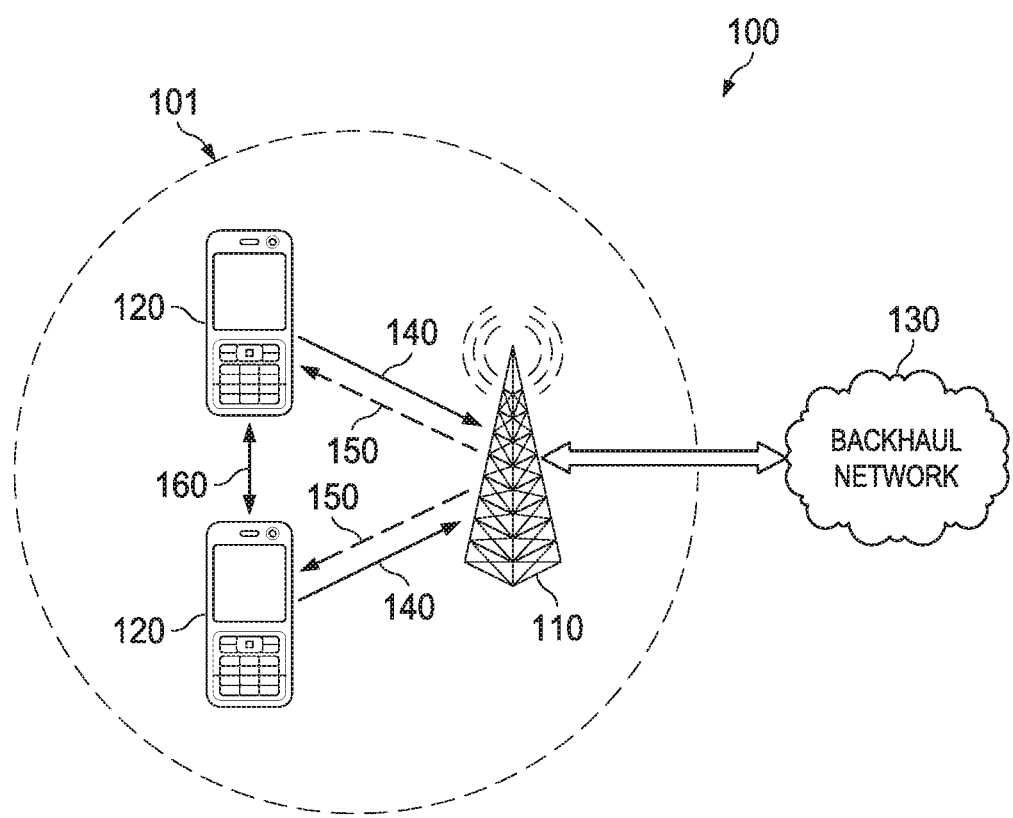
FIG. 1 is a diagram of an embodiment wireless communications network.

FIG. 1 illustrates a communication network 100 in which the embodiments of the present disclosure may be implemented. The network 100 comprises a base station 110 having a coverage area 101, a plurality of UEs 120, and a backhaul network 130. As shown, the base station 110 establishes uplink connections 140 and downlink connections 150 with the UEs 120, which serve to carry data from the UEs 120 to the base station 110 and vice-versa. Data carried over the uplink connections 140 and downlink connections 150 may include data communicated between the UEs 120, as well as data communicated to and from a remote end (not shown) by way of the backhaul network 130. In some cases, the UEs 120 may communicate directly with one another in a device-to-device communication mode over a connection 160 that may be referred to as a sidelink.

As used herein, the term "base station" refers to any component or collection of components configured to provide wireless access to a network, such as an eNB, a 5th Generation (5G) gNB, a transmit/receive point (TRP), a macro-cell, a femtocell, a Wi-Fi access point (AP), and other wirelessly enabled devices. Base stations may provide wireless access in accordance with one or more wireless communication protocols, such as 5G New Radio (5G NR), long term evolution (LTE), LTE advanced (LTE-A), High Speed Packet Access (HSPA), or Wi-Fi 802.11a/b/g/n/ac, etc. As used herein, the term "UE" refers to any component or collection of components capable of establishing a wireless connection with a base station, such as a mobile device, a mobile station (STA), and other wirelessly enabled devices. In some embodiments, the network 100 may comprise various other wireless devices, such as relays or low power nodes.

The network 100 may use various high level signaling mechanisms to enable and configure grant-free transmissions. The UEs 120 may be capable of grant-free transmissions and may signal this capability to the base station 110. This may allow the base station 110 to support both grant-free transmissions and conventional signal/grant transmissions (e.g., for older mobile device models) simultaneously. The UEs 120 may signal this capability by, for example, Radio Resource Control (RRC) signaling defined in the Third Generation Partnership Project (3GPP) standards.

The base station 110 may use high-level signaling mechanisms (e.g., a broadcast channel and/or a slow signaling channel, such as RRC signaling) to notify the UEs 120 of information necessary to enable and configure a grant-free transmission scheme. The base station 110 may update this information from time to time using, for example, a slow signaling channel (e.g., a signaling channel that occurs on the order of hundreds of milliseconds instead of occurring in every transmission time interval (TTI)). Common grant-free resource information can be defined in a broadcast channel or system information. For example, system information may be transmitted by the base station 110 in a System Information Block (SIB). The system information may include, but is not limited to, grant-free frequency bands (start and finish) of the grant-free boundary in frequency and the grant-free partition size.

In some embodiments, the base station 110 may use a combination of some or all of higher layer signaling (e.g., RRC signaling), broadcast signaling, and downlink control channel (such as DCI) for grant-free resource configuration.

Grant-free uplink transmissions are sometimes called "grant-less", "schedule free", or "schedule-less" transmissions. Grant-free uplink transmission can also be referred to as "UL transmission without grant", "UL transmission without dynamic grant", "transmission without dynamic scheduling", "transmission using configured grant". Sometimes, grant-free resources configured in RRC without DCI signaling may be called a RRC configured grant or one type of configured grant. Grant-free resource configured using both RRC and DCI signaling may be also called a configured grant, a DCI configured grant or another type of configured grant.

Figure 2A:
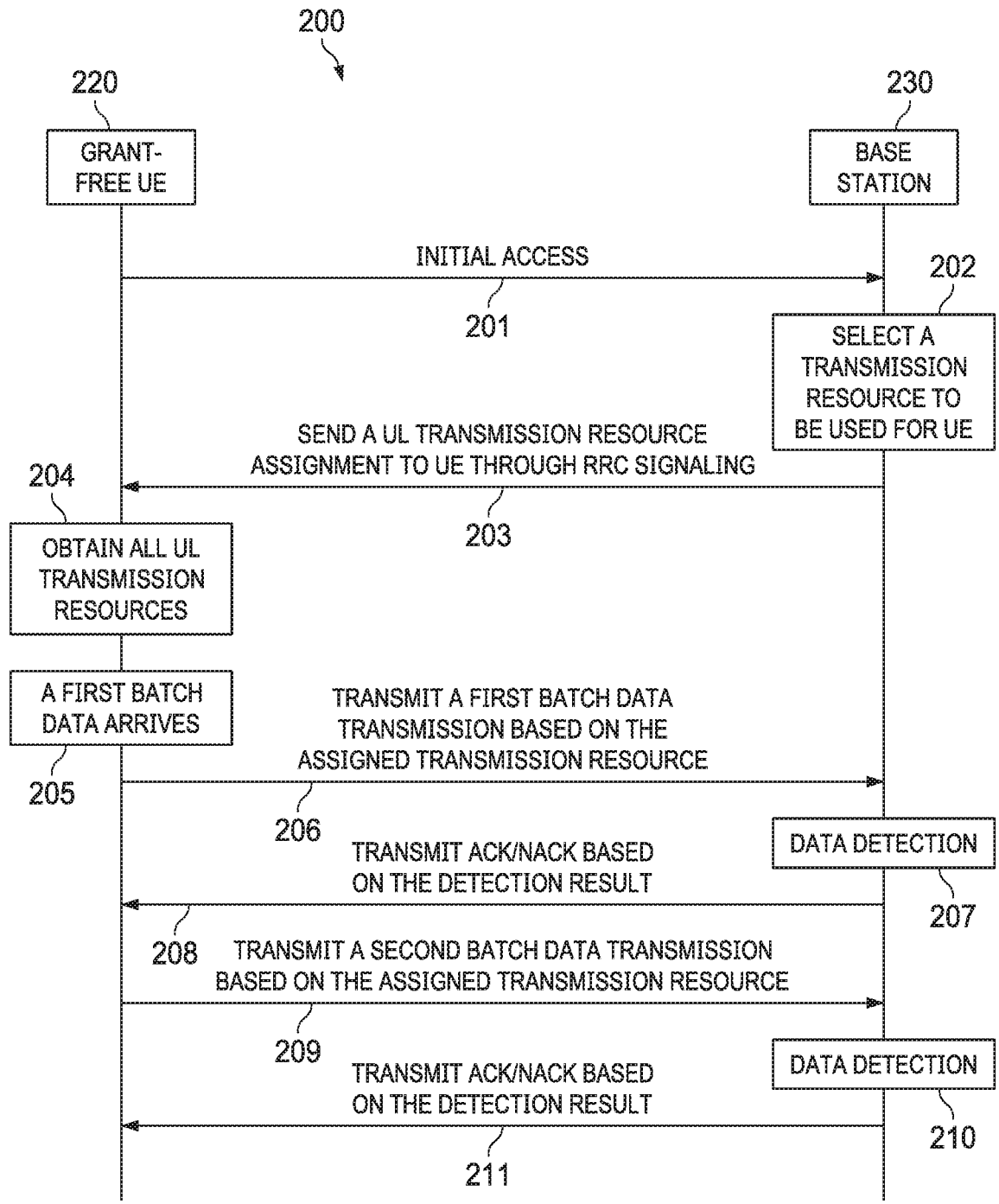
FIGS. 2A, 2B, and 3A to 3F are diagrams of various embodiment message flows between a grant-free UE and a base station.

FIG. 2A illustrates an embodiment method 200 for uplink (UL) grant-free transmissions between a grant-free UE 220 and a base station 230. The transmissions may use RRC information without having to check for Downlink Control Information (DCI) prior to initial transmission of data. The grant-free UE 220 may check for acknowledgement/negative acknowledgement (ACK/NACK) feedback either through a dedicated ACK/NACK channel, such as Physical Hybrid Automatic Repeat reQuest (HARQ) Indication Channel (PHICH) or DCI. The RRC signaling is used for signaling UE-specific and/or group-specific transmission resources and/or for reference signaling configuration. For FIG. 2A, UE 220 may obtain all the transmission resource information after the RRC signaling for configuration, and UE 220 can perform uplink grant-free transmission after the RRC signaling without the detection of an UL grant sent using DCI signaling.

With regard to the UE-specific information, the RRC signaling may be used to notify the grant-free UE 220 about information relevant to grant-free transmission such as, but not limited to, a UE identifier (ID), a DCI search space, grant-free transmission resources, reference signal resources, and other relevant information that may include, for example, a modulation and coding scheme (MCS).

The RRC signaling may include a grant-free ID field, such as a grant-free radio network temporary identifier (RNTI), that is used to define search space and scramble CRC of the further control signaling related to GF transmission, which may be referred to herein as GF-RNTI. The RRC signaling may also include other ID fields, such as cell-RNTI (C-RNTI) or a combination of GF-RNTI and C-RNTI. The GF-RNTI may be used for control signaling used for grant-free (GF) resource configuration, activation/deactivation of GF resource/transmission, HARQ ACK/NACK of GF transmission, a grant-based retransmission, and any other GF related signaling. The RRC signaling may also include one or more of the following fields, but is not limited to the following fields. All the fields described are also optional. The RRC signaling may also, or instead, include one or more configuration super-fields for configuring for UL (such as gf-ConfigUL) and/or for configuring for downlink (DL) (such as gf-ConfigDL). Here, the grant-based retransmission means that the scheduling grant is sent by the network to grant a retransmission of the data initially transmitted using grant-free transmission. The grant-free RNTI used for grant-free transmission described by FIG. 2A may also be used to scramble the Physical Uplink Shared Channel (PUSCH) data of a grant-free transmission. C-RNTI is the standard UE ID used for grant-based transmission. For example, C-RNTI can be used for masking the CRC of a DCI grant for grant-based transmission or a DCI grant for a retransmission of data transmitted using grant-based transmission. C-RNTI can also be used to scrambling the PUSCH data of grant-based data transmission.

Fields in the UL configuration super-field or directly in the RRC signaling may include, but are not limited to, the following examples.

A grant-free_framejnterval_for_UL field may define the periodicity of the resource hopping pattern in terms of a number of sub-frames. It may use frame length, in which case the field may be optional, and the frame length defined for the system may be used by default.

A grant-free_access_interval_UL field may define the interval between two grant-free transmission opportunities. The value may default to be 1 if not specified.

There may also be fields for power control related parameters that may serve a similar purpose as the one used for LTE semi-persistent scheduling (SPS).

A contention_transmission_unit_(CTU)_size_frequency field may define the number of resource blocks used per CTU in the frequency domain or the CTU region block size. The time domain may by default be a subframe or TTI. So only the frequency domain may be needed. The field is not needed if defined in broadcast signaling (such as SIB) or if there is complementary DCI signaling. The contention transmission unit (CTU) may include time and frequency resources used for one grant-free transmission.

When the CTU size is defined in broadcast signaling, the size of the CTU is cell-specific. When the CTU size is signaled in higher layer signaling (e.g., RRC signaling) or DCI signaling, the size of the CTU may be UE-specific and can be the same or different for different UEs. In some embodiments, the CTU size is indicated by the number of virtual resource blocks (VRBs) or physical resource blocks (PRBs). In some scenarios, the CTU size may be the same as the grant-free sub-band size that is used for resource hopping. In this case, if the grant-free sub-band size is predefined or signaled, the CTU size may not need to be explicitly signaled.

A grant-free_frame_interval_for_UL field may define the periodicity of the resource hopping pattern. The periodicity may be defined in terms of a number of sub-frames or any other time unit. The field may use the frame length as a default, in which case the field may be optional. That is, the frame length defined for the system might be used by default.

A grant-free_access_interval_in_the_time_domain field may define the time interval between two adjacent grant-free transmission resources (default to be 1 if not specified). This field may also be used to signal the periodicity of grant-free transmission resources and may serve a similar functionality as the periodicity field in LTE SPS.

A resource_hopping_pattern field may define the resource hopping pattern. In some embodiments, the resource hopping pattern field is defined as a sequence of frequency location indices at each frame at each time interval with a unit time equal to a grant-free schedule interval UL value. In some embodiments, the resource hopping pattern field is defined as a sequence of frequency location indices at each frame at each time interval in general. The time interval can be a TTI, a slot, a time slot, a sub-frame, a mini-slot, an OFDM symbol, a number of OFDM symbols, or any time unit. In some embodiments, the resource hopping pattern field is defined as a sequence of CTU indices at each time interval in each frame. A resource hopping pattern may be provided to a grant-free UE in the form of any one of 1) a single UE index defined from a predefined resource assignment rule, 2) a resource hopping index sequence indicating the frequency index of each time interval, or 3) any implicit or explicit signaling of actual physical time/frequency resources that can be used at each time slot.

A reference_signal_(RS)_hopping_sequence field may define the RS hopping sequence. An index of the RS to be used in frame n may be included. The RS may be fixed for the UE until an update is signaled, and the RS used may change over time. If the RS changes at every time interval, the field may include a sequence of indices at each time interval. The RS hopping sequence may not be needed if complementary DCI is available. An RS hopping sequence may be provided to a grant-free UE in the form of any one of 1) a fixed RS, and 2) a RS hopping sequence in each frame.

A multiple_access_(MA)_signature or MA_signature_tuple or MA_signature_hopping_pattern field may be used by the UE for sending transmissions and retransmissions. The MA signature may include (but is not limited to) at least one of the following: a codebook/codeword, a sequence, an interleaver and/or mapping pattern, a pilot, a demodulation reference signal (e.g., a reference signal for channel estimation), a preamble, a spatial dimension, and a power dimension. The MA signature field may be similar to the RS or RS hopping field, but the MA signature field may indicate the signature/codebook/sequence or any other MA signature used for a multiple access scheme, such as sparse code multiple access (SCMA).

In some embodiments, the CTU and resource/RS hopping pattern may be signaled using a combination of assigned VRBs/PRBs and a hopping sequence. Such a signaling scheme will be described below in more detail. Assigned VRBs/PRBs may be VRB index or PRB index. A VRB index or a PRB index may be signaled using, for example, a starting RB index or a starting resource block group (RBG) index together with the number of RBs or the number of RBGs. A RBG refers to a group of RBs consisting of more than one RBs.

An MCS field to provide MCS information, if no complementary DCI signaling is being used. The MCS information may be UE-specific or resource-specific. The MCS field may also indicate whether (or by how much) the MCS is to be reduced after the initial transmission for the UE. For example, an MCS hopping pattern may be assigned to the UE for the grant-free uplink transmission. The MCS hopping pattern may indicate that an initial transmission may have a high MCS, a first retransmission may have a lower MCS, and a second retransmission may have an even lower MCS, etc.

The number of repetitions K or the maximum number of repetitions K may be performed by the UE. For example, the UE may be configured to continue sending retransmissions until an ACK is received, but only up to a maximum of K retransmissions; or the UE may be configured to perform K repetitions without any feedback between the repetitions. If K repetitions have been sent and an ACK is still not received, then the UE no longer sends any repetitions, and the UE considers that the data has not been received or correctly decoded by the base station.

There may also be fields for power control related parameters that may serve a similar purpose as the one used for LTE semi-persistent scheduling (SPS).

A search space field may be used for further DCI grant, which may also be predefined by GF_ID or Group_ID. GF_ID is the grant-free UE ID, such as GF-RNTI. Group_ID is the group-based UE ID, such as group_RNTI that is targeting more than one UE as described in this disclosure. The search space defines the potential time-frequency locations for the DCI grant for a UE to be transmitted. The search space can be a function of GF-RNTI or C-RNTI.

The RRC format may include an indication that the UE is a grant-free UE or is allowed to transmit using grant-free resource. The RRC format may include a grant-free UE ID (such as GF-RNTI) or a group-based ID (such as Group_RNTI) that is used for decoding further instructions using DCI.

The above-described RRC signaling content is not limited to the scenario of FIG. 2A and can apply to all grant-free resource configuration scenarios, including all the other examples, figures, scenarios described herein.

In the example of FIG. 2A, the grant-free UE 220 does not need to constantly check for DCI inside the search space and does not need DCI to activate grant-free transmissions. DCI can provide further control signaling to the UE 220. In some embodiments, the grant-free UE 220 may still monitor DCI for possible activation, deactivation, resource update, grant-based scheduling or any other control information that may be sent through DCI.

In some embodiments, whether or not a UE monitors of DCI is signaled. Then, the RRC signaling may also include whether the UE needs to monitor a downlink control channel. In grant-based uplink communications, a UE may regularly monitor a downlink control channel for DCI being communicated to the UE, e.g., receiving a scheduling grant for the UE. However, when the UE is configured to perform grant-free uplink transmissions, the UE may not need to monitor the downlink control channel as frequently, or the UE may not need to monitor the downlink control channel at all. How often (if at all) a UE performing grant-free uplink transmissions needs to monitor the downlink control channel may be set by the network. For example, a UE performing grant-free uplink transmissions may be configured to monitor the downlink control channel once every T subframes, where T is a parameter configured by the network.

Prior to the start of the steps of FIGS. 2A, 2B, 3A, and 3B, system information may be periodically transmitted by the base station. The system information may include information that is to be used by the UE. If information that would be used by the UE is not defined in the system information, then that information may be provided in RRC signaling and/or DCI messages.

As shown in FIG. 2A, at step 201, the UE 220 capable of grant-free transmissions first enters a network supported by the base station 230 and performs initial access, for example, by sending a preamble through a random access (RA) channel (RACH) as a part of a random access procedure in an LTE network. The UE 220 may signal to the base station 230 an indication indicating that the UE 220 is grant-free transmission capable, for example, when the UE 220 expects to transmit a large amount of small data packets.

At step 202, the base station 230 receives the RACH RA preamble or any other signal used for initial access and selects a UL transmission resource to be used by the UE 220. An embodiment provides that the UL transmission resources comprise a predefined multiple access (MA) hopping pattern in a frame. For example, the MA hopping pattern may include a predefined time/frequency resource hopping pattern in a frame and/or a predefined RS hopping pattern. The MA hopping pattern provides a universal RS and transmission resource mapping scheme that supports different numbers of UEs in uplink grant-free MA transmissions. The base station 230 can obtain the predefined MA hopping pattern from the network, for example to save the MA hopping pattern, or the base station 230 may obtain the MA hopping pattern by generating the MA hopping pattern based on a predefined pattern generating scheme or a predefined rule. In addition to the MA hopping pattern, there are various other elements used to define the transmission resources that are included in RRC signaling and that are transmitted to the UE 220.

At step 203, the base station 230 sends a UL transmission resource assignment to the UE 220 through RRC signaling after selecting the transmission resource to be used for the grant-free UE 220.

At step 204, the grant-free UE 220 determines the available UL transmission resources. In some embodiments, the UE 220 can derive the transmission resources based on predefined rules after receiving the transmission resource assignment. Alternatively, the UE 220 can look up a table and the predefined transmission resource hopping pattern after receiving the above transmission resource assignment. The UE 220 can save the predefined transmission resource pattern and table. Furthermore, the UE 220 can update the predefined transmission resource pattern and table after receiving the signaling to instruct the update information.

At step 205, a first batch data arrives at the grant-free UE 220 for transmission to the base station 230.

At step 206, after the first batch data has arrived, the UE 220 transmits the first batch data transmission based on the assigned grant-free transmission resource. The grant-free resources may be assigned to the UE 220 semi-statically. "Semi-static" is used herein in comparison with the "dynamic" option that operates in every time slot. For example, semi-static can operate periodically with a given time period, such as 200 or more time slots. Once the grant-free UE 220 obtains the assigned resources, the UE 220 may transmit data using assigned resources immediately after data arrives, without obtaining a grant. The UE 220 may transmit the initial transmission of the first batch data using the assigned UL transmission resources. In some embodiments, once the first batch data arrives in the grant-free UE's buffer, the UE 220 determines the CTU regions of the next time interval or the next opportunity the UE 220 can access from the resources assigned to the UE 220. The UE 220 determines the next time interval for CTU access after data arrives, and the UE 220 searches for the CTU region at that time interval based on the assigned resource hopping sequence. The UE 220 may then transmit the initial transmission of first batch of data using that CTU region and the RS assigned for that region. The transmission may include a RS signal and a data signal.

In step 207, the base station 230 detects the data after receiving the first batch data transmission. In some embodiments, when the UE 220 sends a message to the base station 230, the base station 230 first attempts to detect the MA signature. Detecting the MA signature is referred to as activity detection. By successfully performing activity detection, the base station 230 knows that the UE 220 has sent a grant-free uplink transmission. However, successful activity detection may or may not reveal the identity of the UE 220 to the base station 230. If there is a predefined RS pattern between a UE and an MA signature, then successful activity detection reveals the identity of the UE that sent the grant-free uplink transmission. In some embodiments, activity detection may further include obtaining the UE ID, e.g., if the UE ID is encoded separately from the data.

As part of the actions taken at step 207, if activity detection is successful, the base station 230 then attempts to perform channel estimation based on the MA signature and optionally additional reference signals multiplexed with the data message, and then the base station 230 decodes the data.

In step 208, the base station 230 sends an ACK or NACK based on the decoding result at step 207. The base station 230 attempts to decode the initial transmission of the first batch data by first performing activity detection by decoding the RS signal, performing channel estimation using the RS signal, and then attempting to decode the data. If the base station 230 can successfully decode the data, the base station (BS) may send an ACK to the UE 220 to confirm the successful decoding. If the base station 230 does not decode the data successfully, the base station 230 may send a NACK to the UE 220 or does not send any feedback at all. In some embodiments, after the initial transmission of first batch of data in step 206, the UE 220 may choose to immediately retransmit the first batch of data using the next available resources according to the resource assignment in step 203. In other embodiments, the UE 220 may wait for a predefined period, and if the UE 220 receives an ACK within the predefined period, the UE 220 will not perform the retransmission. If the UE 220 does not receive an ACK within the predefined period, the UE 220 may retransmit the first batch data at the next available CTU resources after the predefined period.

The UE 220 may check for ACK/NACK feedback that may be transmitted either through a dedicated ACK/NACK channel, such as the PHICH, or through DCI or group DCI by searching the search space.

In FIG. 2A, it is assumed that the base station 230 has transmitted an ACK in step 208, because the grant-free UE 220 has received a second batch data transmission and is not retransmitting the first batch data transmission. The UE 220 transmits the second batch data at step 209 based on the obtained transmission resource without communicating, to the network entity, a corresponding transmission resource assignment assigning the transmission resources to the UE 220. Steps 210 and 211 are similar to steps 207 and 208, respectively.

If the base station 230 had sent a NACK in step 208, then the UE 220 would retransmit the first batch data transmission based on the assigned transmission resource defined in the RRC signaling or an alternative transmission resource that is provided to the UE 220.

In some embodiments, the UE 220 may only check for a dedicated ACK/NACK channel, such as the PHICH, but does not check for DCI after the first transmission. Therefore, the UE 220 may only perform grant-free transmission and retransmission. The UE 220 may save energy by not being required to check DCI even after the first transmission.

Steps 206-209 of FIG. 2A and the associated description of the grant-free transmission/retransmission and HARQ response from the base station are only examples of the grant-free transmission/retransmission details based on assigned grant-free resources in the prior steps. There may be other steps for grant-free transmission/retransmission and HARQ response for the given grant-free resource assignment. The grant-free resource assignment and signaling can still apply to all these grant-free transmission/retransmissions. In some embodiments, the base station (BS) may send a UL grant via DCI signaling as a HARQ response to the grant-free transmission instead. The grant can be a retransmission grant, i.e., the BS may send an uplink grant for a retransmission of the data transmitted in the grant-free transmission. The UE may then send the retransmission according to this uplink grant. In this case, the RRC configured GF-RNTI may be used for scrambling the CRC of the retransmission grant of grant-free transmission. In some embodiments, UE may continue retransmission or repetition until a DCI indicating retransmission grant is received or until the number of repetitions reaches a number K, where K can be preconfigured in UE specific RRC signaling. If UE receives an UL grant sent in DCI for a retransmission, UE then retransmit the data of the grant-free transmission using the resource indicated by the retransmission UL grant.

In some embodiments, for a grant-free resource configured using non-DCI signaling (e.g., RRC signaling), an example of which is shown in FIG. 2A, the grant-free resource assigned for a UE may still be updated or released semi-statically (e.g., through RRC) or dynamically (e.g., via DCI).

In some embodiments, for a grant-free resource configured using non-DCI signaling (e.g., RRC signaling), an example of which is shown in FIG. 2A, a UE may still wait for a DCI activation before the UE can transmit a grant-free transmission even though the resource is already configured by higher layer signaling. The DCI activation may or may not include further resource configuration information. The grant-free resource for the UE can also be disabled/deactivated dynamically using DCI or semi-statically using RRC signaling.

Figure 2B:
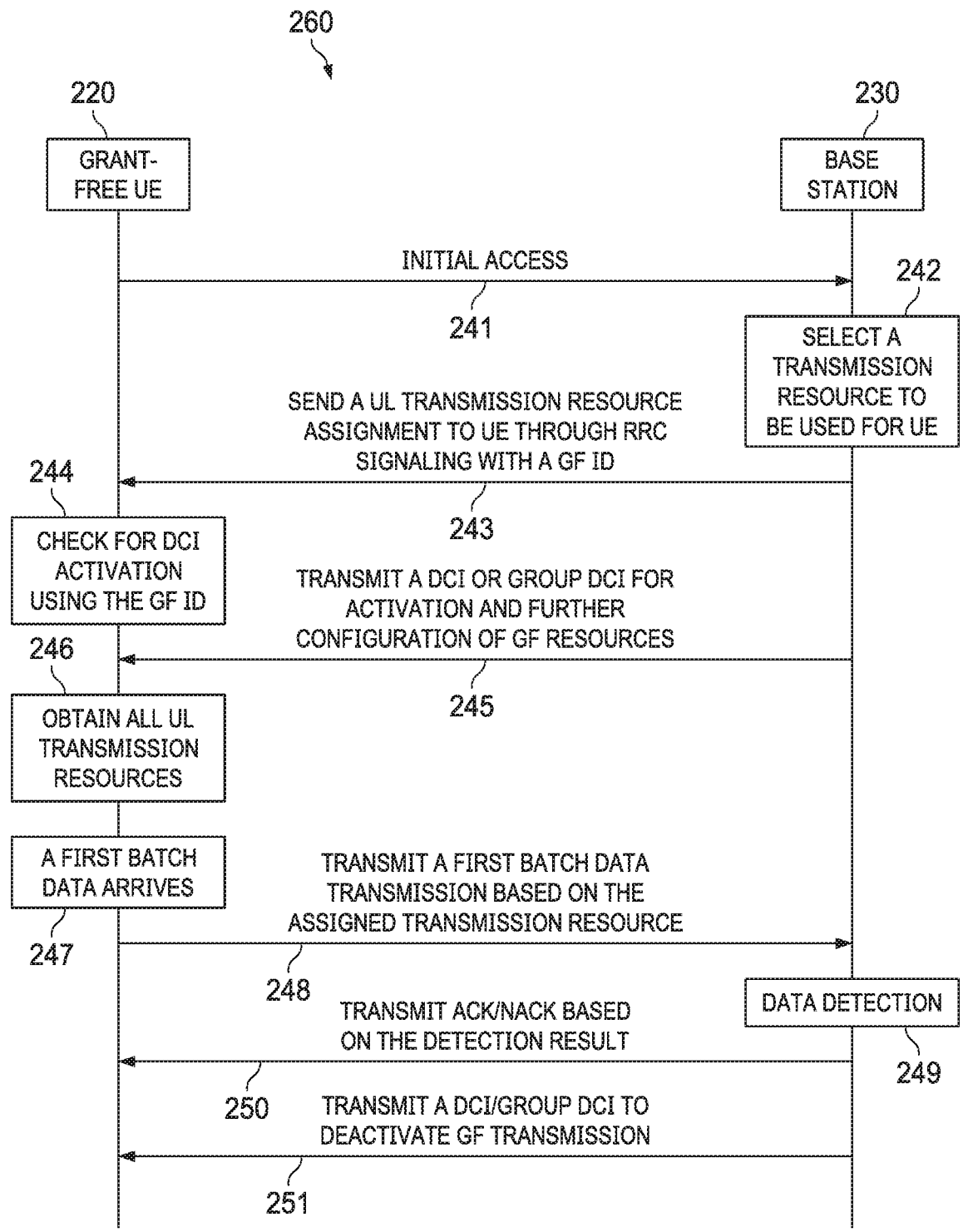

FIG. 2B illustrates an embodiment procedure 260 of grant-free resource configuration that uses a combination of higher layer signaling (e.g. RRC signaling) and complementary DCI signaling. The difference between the examples in FIG. 2B and FIG. 2A is that, in FIG. 2B, the UE 220 may need to receive a DCI signal for configuration of resources before the UE 220 can perform grant-free transmission. In FIG. 2B, the UE 220 may need to monitor DCI after the RRC signaling DCI signaling may be used to provide additional relevant information to the UE 220.

The grant-free resource signaling field may be similar to the example of FIG. 2A, and the RRC signaling field may include some or all of the fields described with regard to FIG. 2A. However, in some embodiments, some of the fields in the RRC signaling may be moved to the DCI activation/configuration step instead. These fields may include information that is typically used in a DCI grant, such as resource block assignment and resource hopping pattern, MCS, RS, and RS hopping pattern.

The FIG. 2B embodiment procedure for UL grant-free transmissions includes using RRC signaling with complementary DCI signaling. The DCI signaling may function as activation or deactivation. Activation and deactivation indicators are sent by the base station 230 using DCI messages to indicate that the UE 220 is permitted or not permitted to do grant-free transmission. In this case, the DCI activation may provide further information for grant-free resource assignment. Without the DCI activation, the UE 220 may not obtain enough information for grant-free transmission using RRC signaling alone.

In some embodiments, the DCI may have the following format:

| Field | Value |
| --- | --- |
| MCS/RV | Initial MCS value, RV = 0 |
| NDI | 0 (new transmission) |
| DMRS cyclic shift | Signal the first RS value at a given frame |
| Resource block allocation | Signal a first resource block allocation at first time interval |

Based on the first RS value and the first resource block (or virtual resource block assignment) in combination with a resource hopping sequence and an RS hopping sequence (or just a predefined RS hopping rule over frames), the UE 220 can figure out the particular resource/RS allocation at each CTU.

The RRC signaling assigns a grant-free UE ID or a group ID to a group of UEs. The RRC signaling also includes the definition of the search space so that the UE 220 knows where to search for the DCI activation. The search space may also be defined by the UE ID (e.g. GF-RNTI) or group ID (e.g., group_RNTI). After receiving RRC signaling, the UE 220 still cannot perform grant-free transmission until receiving further DCI signaling. In some cases, the DCI signaling may serve as an activation of the grant-free transmission. In some embodiments, the DCI signaling may serve as a semi-static complementary signaling to help specify grant-free resources for the UE 220. In some embodiments, the DCI signalling may serve as both activation and resource configuration. The UE 220 may need to wait until receipt of the DCI activation. Thus, the UE 220 may need to monitor the search space for the activation and deactivation indicators. The grant-free UE 220 decodes the DCI using the assigned grant-free or group ID for activation or deactivation of grant-free transmissions.

Steps 241 and 242 in FIG. 2B are the same as steps 201 and 202 in FIG. 2A.

Step 243 in FIG. 2B is similar to step 203 in FIG. 2A, except that the RRC signaling in FIG. 2B includes a grant free ID.

Step 244 in FIG. 2B includes the UE 220 checking for a DCI message including an activation at a search space defined in the RRC signaling, or possibly a combination of the RRC and system signaling.

At step 245, the base station 230 sends a DCI activation message to the UE 220.

Steps 246, 247, 248, 249 and 250 in FIG. 2B are the same as steps 204, 205, 206, 207 and 208 in FIG. 2A.

At step 251 in FIG. 2B, the base station 230 sends a DCI deactivation message to the UE 220. After deactivation, the UE may release the GF resource and will not be able to perform GF transmission until a reactivation signal.

Figure 3A:
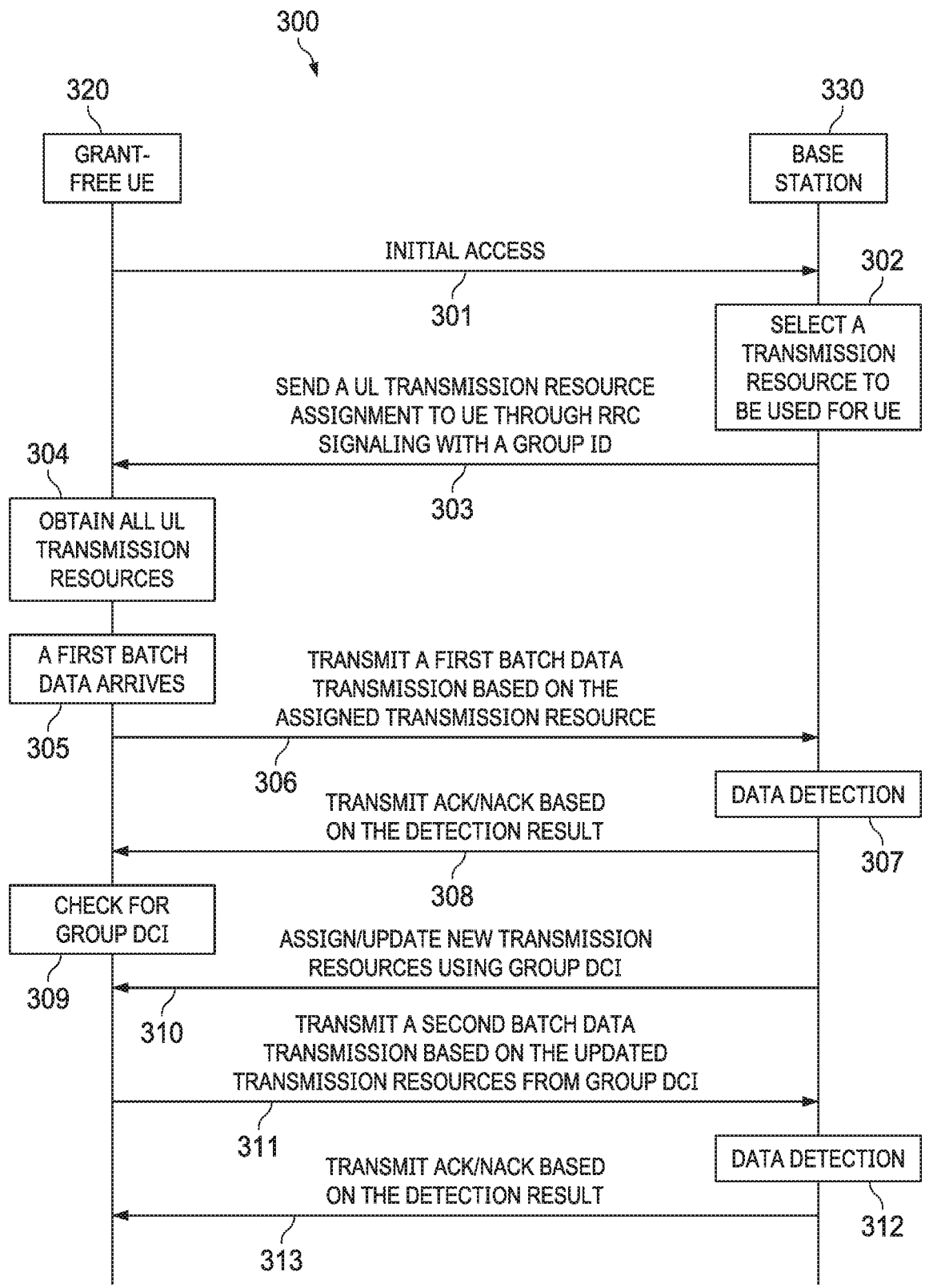

FIG. 3A illustrates an embodiment procedure 300 for UL grant-free transmissions that includes using RRC signaling with a group assignment. The RRC signaling assigns a group ID (e.g., a group RNTI, which may be denoted as group_RNTI herein) to a grant-free UE 320. Other UEs in the same group may be given the same group ID through the other UEs' own respective RRC signaling, because the RRC signaling is UE-specific. A base station 330 may also signal a UE index or multiple UE indices among the group to the UE 320 (e.g., in RRC). The UE index may be used to derive some information, such as resource, RS, MCS of the UE 320. The UE 320 is configured to search a predefined search space of a transmission resource for further DCI messages that are addressed for a group of grant-free UEs that are assigned the group ID (group_RNTI). In FIG. 3A, the UE 320 may not need to check for a group DCI before first transmission. In some embodiments, the UE 320 may also check for DCI or group DCI after RRC configuration.

Steps 301 and 302 in FIG. 3A are similar to steps 201 and 202 in FIG. 2A.

Step 303 in FIG. 3A is similar to step 203 in FIG. 2A, except that the RRC signaling in step 303 includes a group ID.

Steps 304, 305, and 306 in FIG. 3A are similar to steps 204, 205, and 206 in FIG. 2A.

Once the base station 330 has detected the data in step 307, the base station 330 sends a DCI message that includes an ACK or NACK, as shown at step 308. If UE 320 receives an ACK, UE may not perform any retransmission. If UE 320 receives an NACK, UE 320 may perform retransmission. The retransmission can be done in the configured grant-free resource. Note that ACK and NACK are some examples of HARQ feedback provided by the BS to the UE to perform grant-free transmission. There are other types of HARQ feedback and responses from the UE for retransmissions. For example, the BS may also provide a HARQ feedback by sending a UL grant in DCI signaling for retransmission of the data transmitted by the UE through grant-free transmission. In this case, the UE may follow the UL grant to perform a retransmission according to the UL grant.

In step 309, the grant-free UE 320 checks for DCI signaling. The gra-free UE 320 checks the predefined search space and uses the group ID to decode the DCI for further instructions on resource assignment and other instructions.

In step 310, the base station 330 assigns or updates a new transmission resource using the DCI with the group identifier.

When the second batch data transmission arrives at the UE 320, the UE 320 transmits the second batch data in step 311 based on the updated transmission resource from the group DCI. Steps 312 and 313 are similar to steps 307 and 308.

Figure 3B:
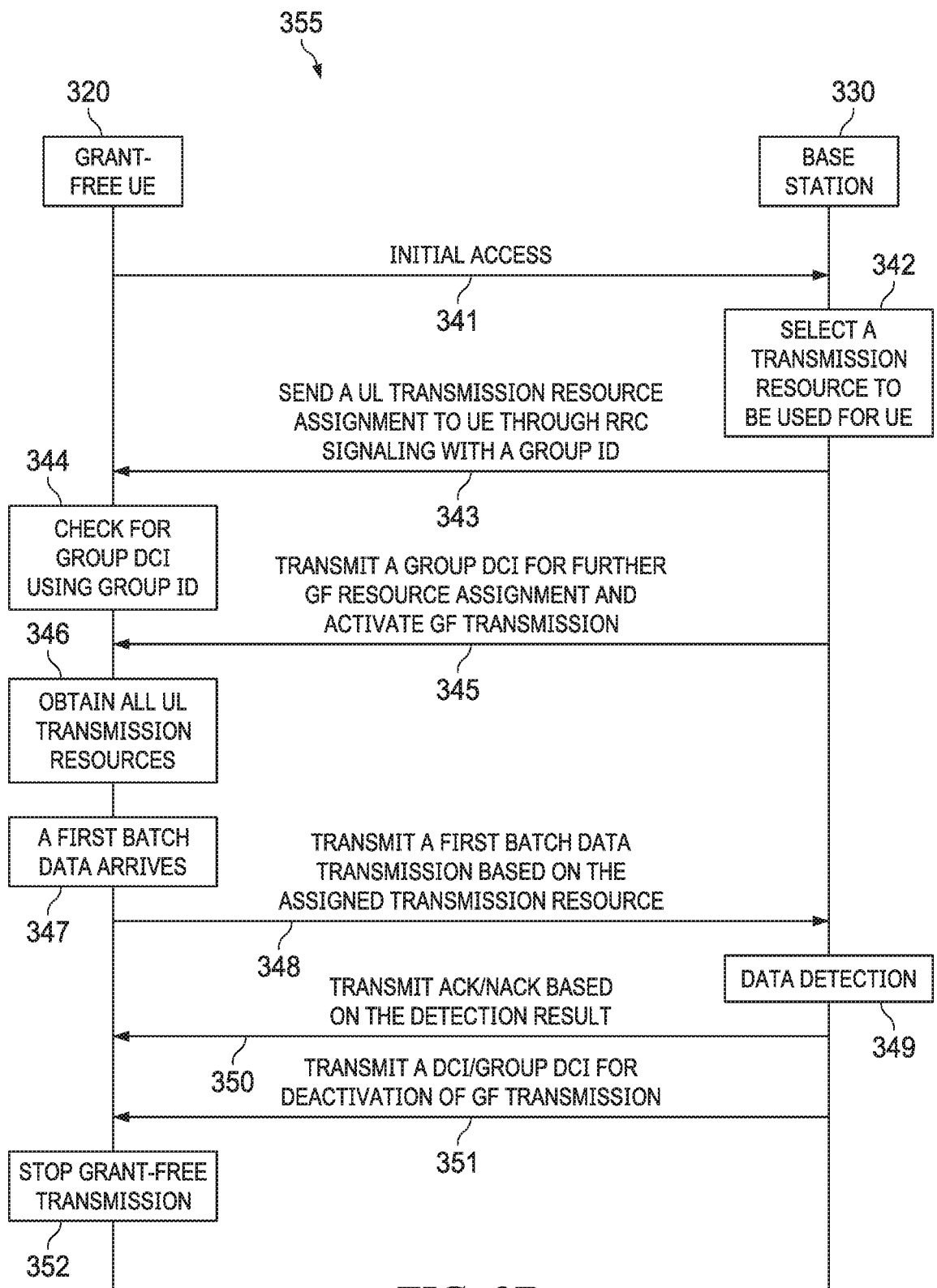

FIG. 3B provides an example similar to that of FIG. 3A, except that the configuration of grant-free resources may include a combination of higher layer signaling and DCI or group DCI signaling Steps 341, 342, and 343 work the same as steps 301, 302, and 303 in FIG. 3A. The UE may need to receive a DCI or group DCI for activation and configuration information before the UE can perform grant-free transmission. At step 344, the UE checks for group DCI using the group ID. At step 345, the base station transmits a group DCI for further GF resource assignment and activating the GF transmissions. At step 346, the UE obtains all the UL transmission resources. Steps 347, 348, 349, and 350 work the same as steps 305, 306, 307, and 308 in FIG. 3A. There may also be a deactivation signal sent in step 351 to deactivate the GF transmission. After that, the UE's previously configured GF resource may be released, and the UE may stop further grant-free transmission until further activation signaling.

In some embodiments, one working mode is that for higher layer signaling configuration, the grant-free (GF) resource can also be activated and deactivated by dynamic DCI signaling for some scenarios. One motivation with DCI deactivation is to dynamically and quickly release the GF resource of first type of traffic and used for second or more other types of traffic in some cases, and later the activation will dynamically configure the resource back to the first type of traffic as needed.

In other embodiments, grant-free to grant-based (GF2 GB) switch can be scheduled in some cases (e.g., emergency usage) second or more other types of traffic to use GF resource configured for first type of traffic. For example, if the gNB can be aware of the low resource utilization or take advantage of knowledge of the first traffic (e.g., VoIP) in the GF resource, it can schedule other types of traffic to temporarily use the GF resource of the first type of traffic.

In some embodiments, for the semi-static configuration on first type of traffic for GF transmission, and in some cases (e.g., emergency usage), eNB can directly schedule a grant to other type(s) of traffic to use the GF resource of the first type of traffic (without releasing it) for temporary usage.

In some embodiments, for the extreme cases where both GF traffic and grant traffic are overloaded, an admission control on the traffic admission can be applied, or the system can budget more resources (e.g., increased system bandwidth) to support the traffic, temporarily or permanently.

In the system with the co-existence of grant-free and grant based transmissions, for one UE and/or multiple UEs, one operation mode is to configure one or more grant-free UEs to listen to DCI signaling at each TTI, or before the data transmission and/or at the TTIs during the data transmissions, where the scheduler can grant non-grant-free UE(s) in the grant-free resource region for a temporary usage. In this way, the grant-free UE(s) can listen to the DCI grants and avoid or reduce the collisions with the UE(s) for the temporary GF resource usage.

In another embodiment, GF resource adjustment can be in a semi-static way and/or on a basis of demand.

For the grant-free transmission, UE can transmit data according to previous configured parameters autonomously. The GF mode or GF resource of a UE can be deactivated semi-statically or dynamically, by non-DCI signaling (e.g. RRC signaling) or DCI signaling. After deactivation, the previous assigned resource will be released, and the UE can reassume GF mode after receiving new GF configuration signaling.

The DCI signaling for activation/deactivation and/or resource configuration can be carried by UE specific DCI or common DCI (e.g. group DCI or group common NR-PDCCH). The DCI for activation/deactivation and/or resource configuration may also carry ACK signaling, i.e., a DCI/common DCI can contain both ACK information and de-activation information. The UE can also reassume GF transmission after receiving DCI based activation signaling. The UE can use the previous configured GF resource or the GF resource configured in the DCI activation signal.

In some embodiments, the network/BS can release the GF resource assigned to a UE if the network/BS did not receive GF data from a UE as expected. Network/BS can notify the UE of releasing the GF resource via RRC or DCI signaling. The release can be done through a deactivation signaling.

In some embodiments, a UE can send a request to network/BS for reassuming the GF resource allocation, via higher layer signaling (e.g. RRC signaling) or uplink control channel (e.g. in a scheduling request (SR)).

In some embodiments, the network/BS may pre-assign a timer for expiring of GF resources. The timer can be signaled in higher layer signaling (e.g. RRC), broadcast signaling (e.g. SIB) or dynamic signaling (e.g. DCI). Both network/BS and UE have the timer information. If no GF transmission from the UE is received after the timer expires, the GF resource may be automatically released. If a GF transmission is received, the timer may be discarded or reset.

In other embodiments, the network/gNB can release the GF resource assigned to a UE for grant-free transmission, for example, when the network doesn't receive GF data from the UE for a configurable time-out period. The UE can even send an explicit message to request network/gNB to release its previously assigned GF resources, due to some scenarios such as no any low latency traffic, or the loading is too congested, etc. The UE can send an message to network/gNB to explicitly switching from GF to GB transmissions. The network can release the UE GF resource and perform any new configurations to the UE using RRC or DCI signaling.

In another embodiment, UE can send a request to network/gNB for reassuming the GF resource allocation via RRC, SR, PRACH, or buffer status report (BSR). A GB UE can use its UL PUSCH channel to bring a SR/BSR to the network for the GF resource scheduling/configuration request, where the BSR can be designed and used for indication of, e.g., traffic priority/importance level, QoS, mobility status, and/or packet size. The SR/BSR can include more control information (other than just for scheduling), such as traffic priority/importance level, QoS, mobility status, and/or packet size, etc. A randomly selected RACH sequence or UE specific RACH sequence can be used in a PRACH channel for UE scheduling request, where the sequence can be designed for more functionality (than typical RACH sequence), for example, identifying UE, traffic priority/importance level, QoS, mobility status, and/or packet size.

In some embodiments, the SR/BSR used to request to reassume GF resource allocation or request for new GF resource may be transmitted through a dedicated uplink control channel or a random access channel for contention based SR transmission. The random access channel may re-use the PRACH channel or be a separated configured channel for contention based SR. The UE may be configured with a dedicated SR sequence or randomly select a SR sequence among a SR sequence pool for the SR transmission.

In general, whether the GF resource is configured using higher layer signaling or a combination of higher layer signaling and DCI signaling, the network/BS may be able to semi-statically (through higher layer signaling) or dynamically activate or deactivate the GF resources and transmissions (e.g. through DCI or group DCI). The GF resources may also be able to be updated semi-statically (e.g. through higher layer signaling) or dynamically (e.g. through DCI or group DCI). When the GF resource and transmission is deactivated, they may be re-activating again.

Figure 3C:
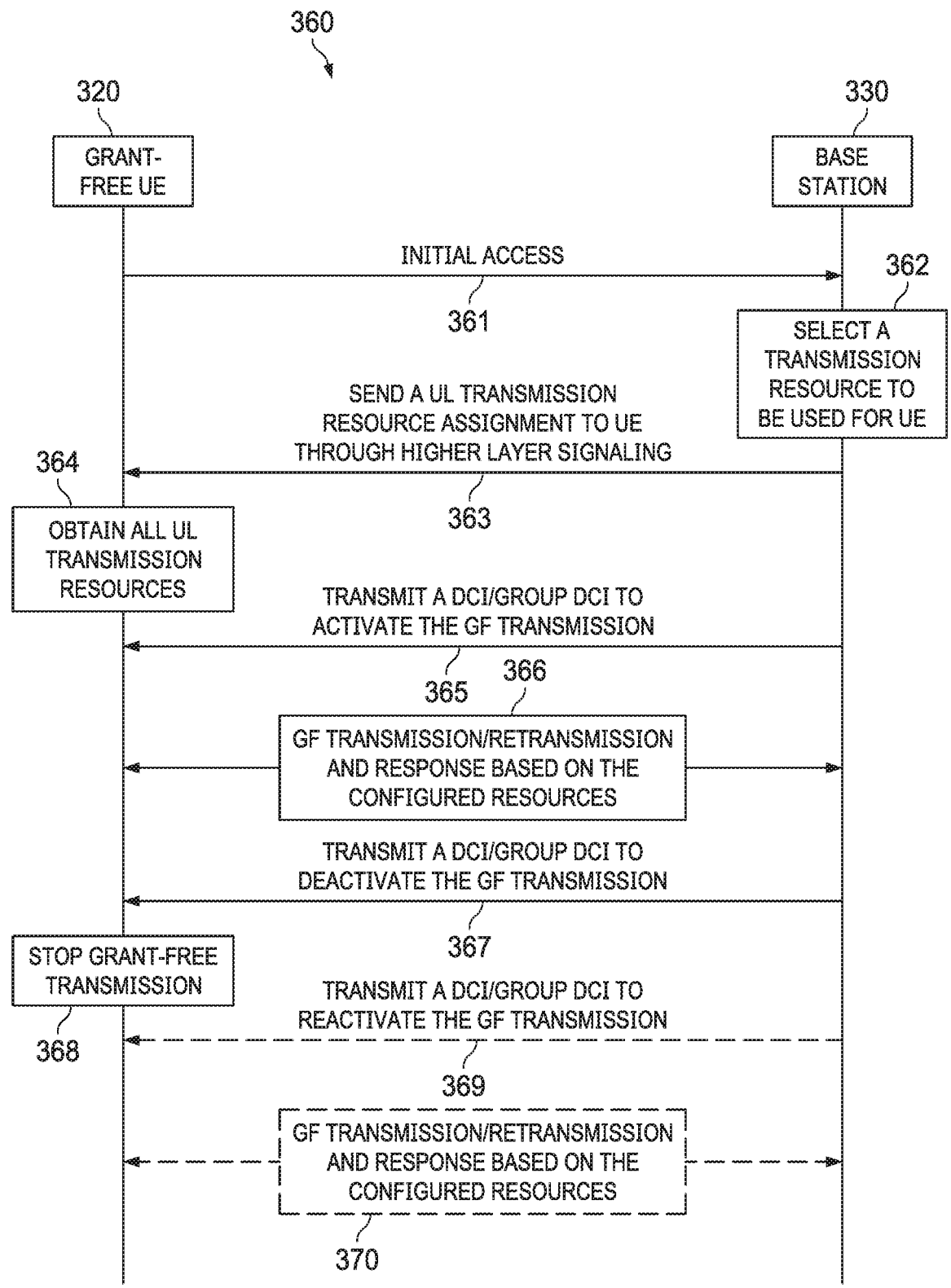

FIGS. 3C-3F provide example embodiments that illustrate different possibilities of activation and deactivation. FIG. 3C shows the scenario where the UE has been configured with all the needed GF resources in the higher layer signaling (e.g. RRC) at step 363. Steps 361 and 362 work the same as steps 301 and 302 in FIG. 3A. The grant-free UE can still be dynamically activated or deactivated using DCI or group DCI. In FIG. 3C, after obtaining the UL GF transmission resources in step 364, the UE may still be required to wait until it receives an activation signaling before GF transmission. The GF the UE may monitor the DCI after step 364 and BS/network transmit an activation signaling through DCI/group DCI. At step 365, the base station transmits a DCI or a group DCI to activate the GF transmission. After receiving DCI activation, the UE may perform grant-free transmission at the configured resource at step 366. The GF resources may be deactivated dynamically. Step 366 may also include the BS sending HARQ feedback indicating ACK, NACK, or an UL grant. Step 366 may further include retransmission performed by the UE as shown in the figure. The HARQ feedback and retransmission performed by the UE can be similar to the steps described in FIG. 3A. If UE receives an ACK, UE may not perform any retransmission. If UE receives an NACK, UE may perform retransmission. The retransmission can be done in the configured grant-free resource. BS may also provide a HARQ feedback by sending a UL grant in DCI signaling for retransmission of the data transmitted by the UE through grant-free transmission. In this case, the UE may follow the UL grant to perform a retransmission according to the UL grant.

In step 367, the BS sends a DCI or group DCI to deactivate the GF resources. In step 368, the UE releases the GF resource and stops grant-free transmission. Optionally, at step 369, the BS may reactivate the GF resource dynamically. After that, at step 370, the UE can perform grant-free transmission again at GF resources configured earlier. Step 370 may be similar to step 366, which includes HARQ feedback or an UL grant sent by the BS and retransmission sent by the UE similar to the steps described in FIG. 3A. The UE may use the GF resources that were configured previously or use the GF resources indicated in the activation/reactivation signal or a combination of the two.

Figure 3D:
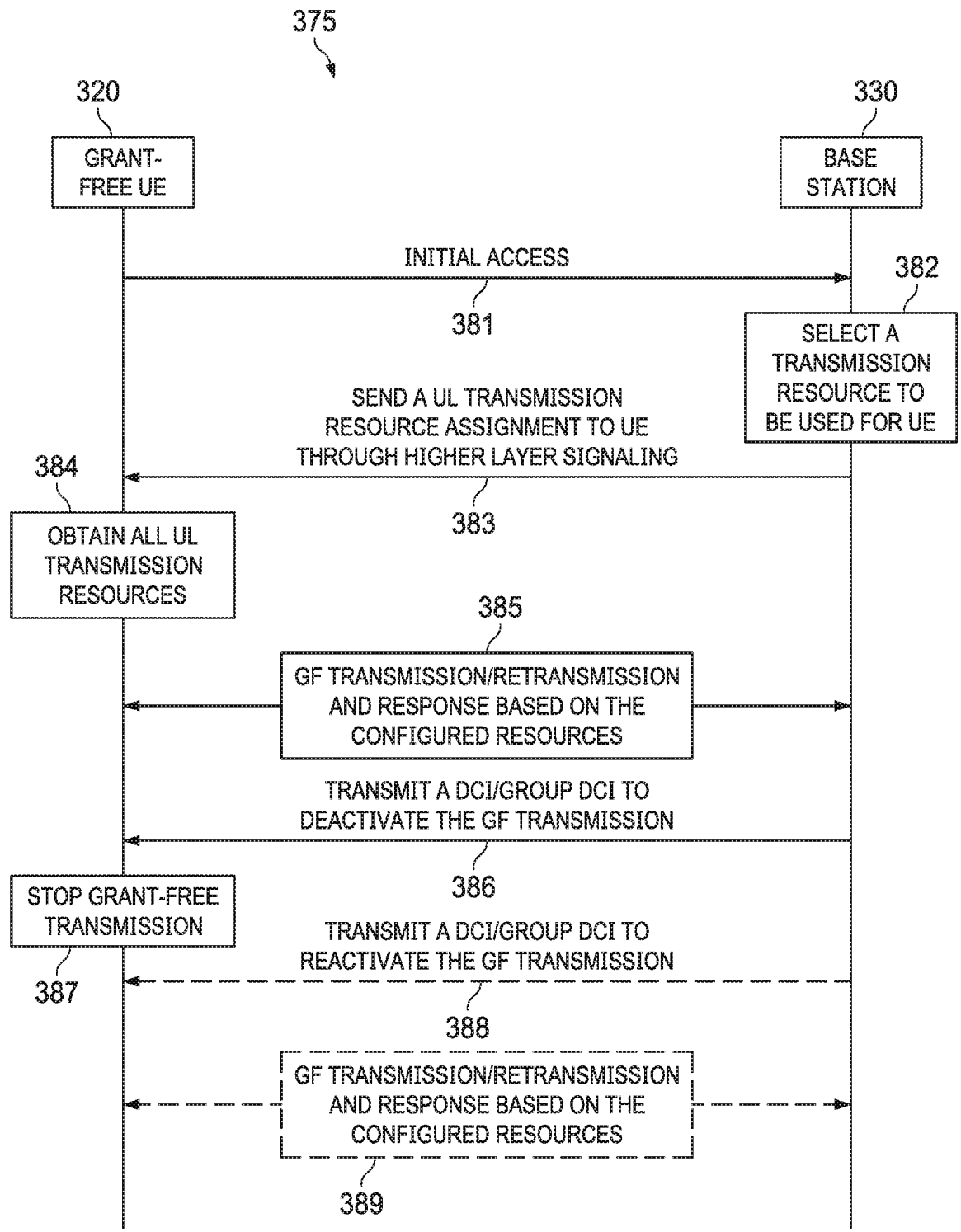

FIG. 3D shows a scenario where the UE has been configured with all the resources through higher layer signaling Steps 381, 382, 383, and 384 work the same as steps 361, 362, 363, and 364 in FIG. 3C. However, the UE does not need a DCI activation signal before it can perform GF transmission in step 385. The UE may receive a DCI deactivation signal at step 386 and release the GF transmission resource. Steps 387, 388, and 389 work the same as steps 368, 369, and 370 in FIG. 3C.

Figure 3E:
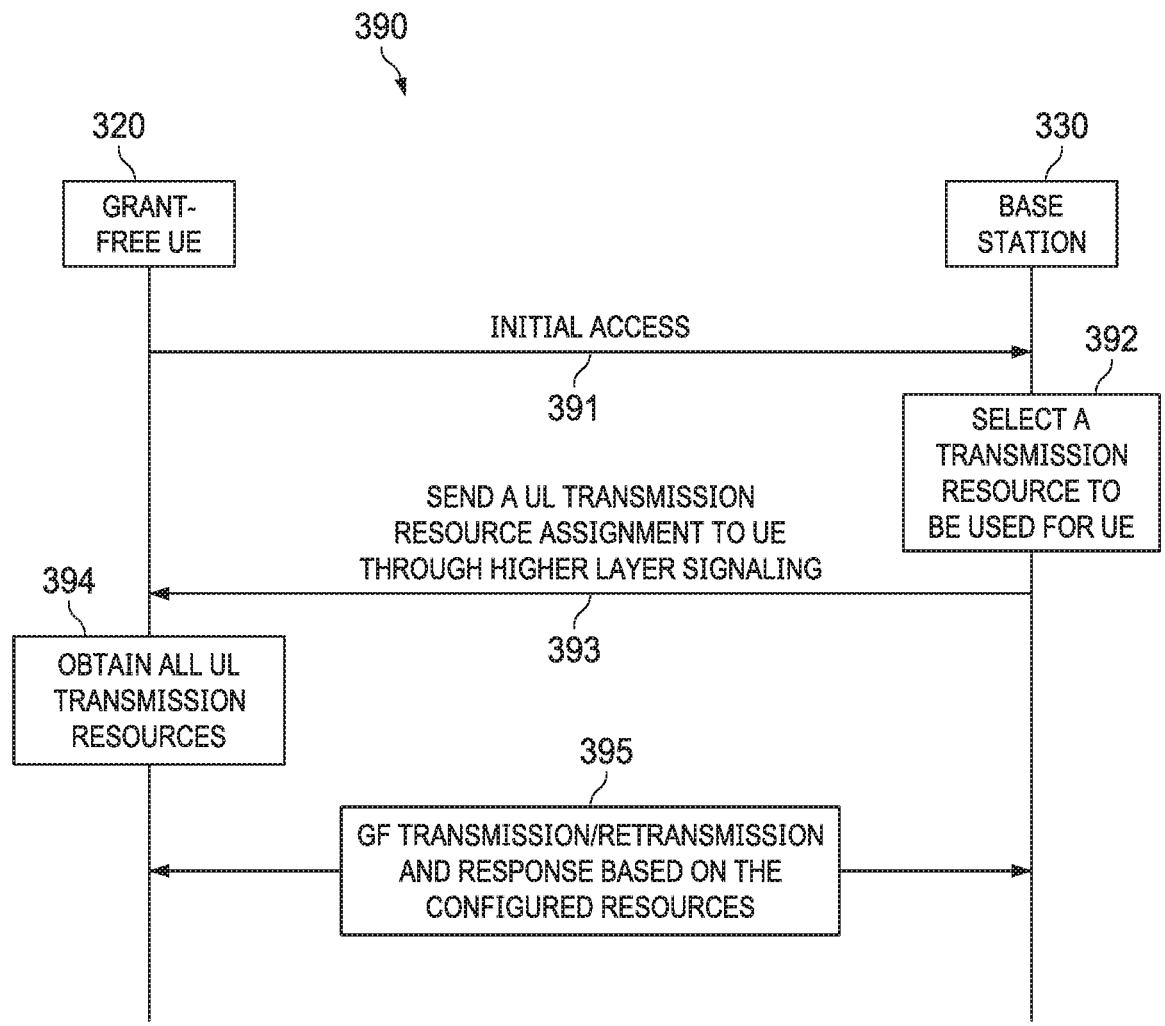

FIG. 3E shows a similar resource configuration as FIG. 3C and FIG. 3D, but there is no dynamic DCI activation or deactivation. Steps 391 and 392 work the same as steps 361 and 362 in FIG. 3C. The UE can perform GF transmission at the configured resource in step 393 without receiving an activation signal. Steps 394 and 395 work the same as steps 384 and 385 in FIG. 3D.

Figure 3F:
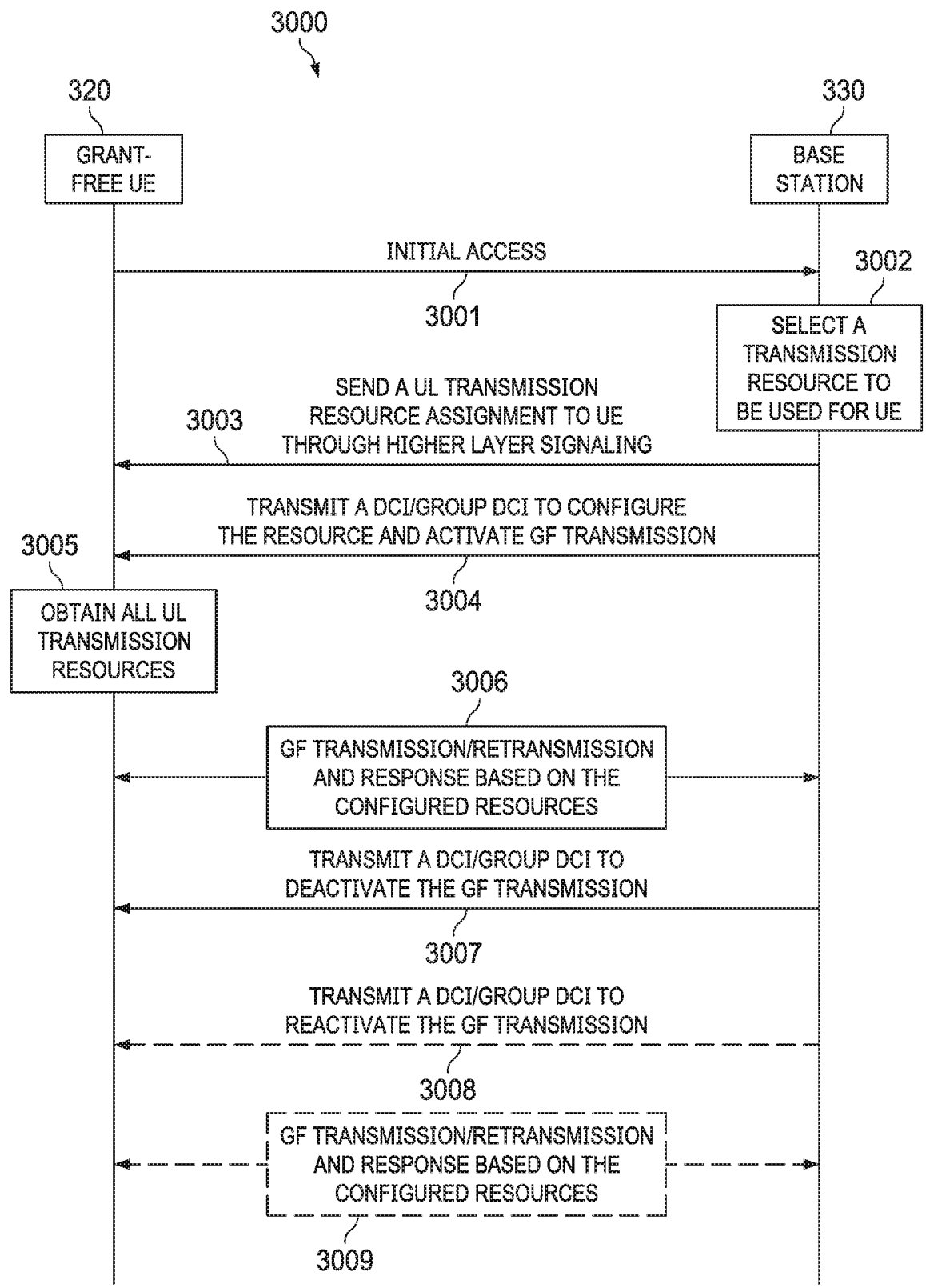

FIG. 3F shows a different resource configuration. Steps 3001 and 3002 work the same as steps 391 and 392 in FIG. 3E. The higher layer signaling (RRC) may only provide some information of the GF resource configuration at step 3003. The UE needs to wait for the DCI or group DCI activation signal transmitted from the base station at step 3004. The DCI or group DCI also provides further information on GF resource configuration before the can perform grant free transmission. Steps 3005 and 3006 work the same as steps 394 and 395 in FIG. 3E. The base station can deactivate the GF resource dynamically as in step 3007. Optionally, the BS may reactivate the GF transmission using a DCI or group DCI at step 3008. After that, at step 3009, UE may perform GF transmission using the preconfigured resource or resource configured in the DCI activation/reactivation signal or a combination of the two.

In all scenarios which support dynamic DCI activation or deactivation, the GF resources may be reactivated dynamically using a DCI activation/reactivation signal.

In some embodiments, the network/gNB configures GF resources and access regions for special usages or services, e.g., emergency traffic, unexpected low latency traffic, which can be used by any UE (e.g., grant-free and/or grant-based) or a group of pre-defined (e.g., embedded in the device) or pre-configured (e.g., during UE initial access) priority users such as medical professionals, urgent-event processing people, etc. Moreover, the urgent or emergency type of traffic can be pre-defined or specified by pre-configuration.

In other embodiments, the network/gNB can take advantages of UE capability and its QoS requirements to configure or grant emergency GF resources for special usages or services in order to reduce collisions or increase the resource spectrum efficiency. For example, the network/gNB can monitor all UEs for their QoS requirements and the types of devices to figure out how large a resource region to configure/grant for the urgent services. In another example, if a UE enters the network with reported QoS or specified special services, even though without immediate urgent traffic but with potential urgent traffic generation later or soon, the network/gNB can guide the UE to use the emergency GF resource region upon the arrival of the urgent traffic. In another embodiment, the network/gNB can pre-configure or grant some UEs with dedicated or shared resources, which can be dynamically activated for usage or can be used without any DCI activation, but if no urgent traffic is available for transmission, the resources can be skipped by these UEs (like LTE SPS uplinkSkip scheme).

In other embodiments, the GF resource configuration, the eligibility or rule to use the urgent GF resource region, and specified urgent type of traffic pre-configuration can be done by broadcast signaling, RRC signaling, and/or DCI related (e.g., UE specific DCI, group common PDCCH, etc.) signaling, wherein the priority UEs can be configured in their initial access or any other time by RRC signaling or L1 signaling, which may or may overwrite their pre-defined (e.g., embedded in the device) priority statuses if any. The configuration of the urgent GF resources may consider certain required robust transmissions, such as RS, MCS, numerology and repetitions, etc.

In other embodiments, any UE may receive the information from the network, including the configuration on the GF resource region for urgent usage. If the UE has urgent traffic (as specified by pre-definition or pre-configuration signaling) to transmit, it can take advantage of the urgent GF resources to transmit its urgent traffic, using the parameters (e.g., RS, MCS, numerology, sub-band, etc.) configured for the urgent GF resource access.

In another embodiment, the network/gNB may process the transmissions in the special GF access region same as or different from that for regular GF traffic processing, depending on the scenarios. In some cases, the network/gNB can process the transmissions in a special way in terms of fast processing and reaction, etc.

In some embodiments, the GF resource region for urgent usage may be configured through broadcast signaling, e.g. in SIB. For this scenario, the UE may be able to access and perform GF transmission on this type of GF resource region without requiring a GF resource configuration from unicast or multicast signaling (e.g. RRC signaling or DCI signaling).

In some embodiments, the UE may be able to access this type of GF resource region that is configured for urgent usage for GF data transmission without first performing an initial access even if the UE is in non-RRC connected state (e.g. idle or in-active state).

In some embodiments, the UE may have been previous configured GF resource via higher layer signaling or DCI signaling and UE is waiting for a DCI activation or the GF resource has been deactivated or GF resource has been released because of time-out of the configured GF timer. However, if the UE has some urgent data traffic, the UE may be able to perform GF transmission on previously configured GF resource without receiving an activation/reactivation signal.

In another embodiment, GF UEs can be configured and dynamically switched to GB UEs, and switched back to GF UEs again as needed; or vice versa.

Moreover, instead of switching between GF UE and GB UE status, any GB UE can be dynamically added and configured anytime as having a GF UE status, and any GF UE can be removed from the GF UE status. The configuration can be DCI-type signaling (e.g., UE specific DCI, group common DCI), non-DCI type signaling (broadcasting, RRC, multi-casting), or a combination of them. Any GF UE can have the similar configuration to from being added a new status as GB UE also, and being removed from the GB UE status. Furthermore, any UE with both GF and GB UE status, can be removed any of the two access statuses, e.g., to remove GF UE status, or to remove GB UE status, and the incurring signaling on the UE status changes may be necessary.

Embodiments of the present disclosure provide additional features to the grouping of UEs described above. FIG. 4 illustrates a set 400 of time and frequency domain resources available to a plurality of UEs in the coverage area of a cell. In the example embodiment of FIG. 4, 20 UEs are shown, but other numbers of UEs could be present. In the embodiment of FIG. 4, four successive time slots 402 are shown as an example of a sequence of time slots. The time slots 402, time units or time intervals described herein may be a subframe, a TTI, a mini-slot, a slot, a frame, or in general any time interval. FIG. 4 may also apply to the case where the time slots 402 are not successive or continuous. The interval between two time slots 402 may be signaled by the grant-free access interval/periodicity described above. In an embodiment, in a given time slot 402, the UEs are grouped into a plurality of frequency sub-bands 404, such that each UE is in one of the groups 406. Thus, any group 406 consists of a certain number of UEs that share the same time slot 402 and the same sub-band 404, and thus the UEs in a group 406 share the same resource block. In other embodiments, UEs in a group, e.g. group 406, may just share the same time unit and subband, but may not share the same resource block. In the illustrated embodiment, the available frequency bandwidth is divided into five sub-bands 404, but in other embodiments, the available frequency bandwidth may be divided into a different number of sub-bands. The size of a sub-band 404 may be the same as the size of a grant-free resource 406 in the frequency domain. Alternatively, the size of a sub-band 404 may be larger than the size of a grant-free resource 406 in the frequency domain. In the illustrated embodiment, there are four UEs in each group 406, but in other embodiments, other numbers of UEs may be present in each group 406. The groups 406 of time and frequency resources may have equal sizes or different sizes. The numbers illustrated in the groups 406 represent indices of the UEs in a group 406. For example, the four UEs in group 406a have indices 1, 6, 11, and 16. Hereinafter, the UEs in a group 406 may be referred to by their indices, such that the UEs in group 406a may be referred to as UE1, UE6, UE11, and UE16, the UEs in group 406b may be referred to as UE2, UE7, UE12, and UE17, and so on.

In an embodiment, the likelihood of a collision between two or more UEs is reduced by shifting the sub-band 404 to which a UE is assigned in a subsequent time slot 402. In an embodiment, the amount of the shift may be different for each of the UEs in a group 406. Using the UEs in group 406a as an example, UE1, which is in sub-band 404a in time slot 402a, is shifted by one sub-band 404 to sub-band 404b in time slot 402b and thus is in group 406g in time slot 402b. UE6, which is in sub-band 404a in time slot 402a, is shifted by two sub-bands 404 to sub-band 404c in time slot 402b and thus is in group 406h in time slot 402b. UE11, which is in sub-band 404a in time slot 402a, is shifted by three sub-bands 404 to sub-band 404d in time slot 402b and thus is in group 406i in time slot 402b. UE16, which is in sub-band 404a in time slot 402a, is shifted by four sub-bands 404 to sub-band 404e in time slot 402b and thus is in group 406j in time slot 402b. Similar shifts may be seen in the other UEs in the other groups 406. In other embodiments, as will be described in more detail below, the shifting of UEs to other groups 406 may occur in other manners.

The shifting of sub-bands described above may be referred to as resource hopping, and a pattern of the shifting may be referred to as a resource hopping pattern. RRC signaling or DCI signaling or a combination of RRC signaling and DCI signaling may be used to define the resource hopping pattern for the members of a group 406 and may also designate how many members of a group 406 use the same pattern. An access interval may also be defined to specify how often in the time domain resources are located, for example, every one TTI, every two TTIs or some other interval. System information may specify the number of sub-bands 404 present and the number of resource blocks in each sub-band 404. For example, if one of the groups 406 is allocated with five resource blocks, that group 406 may be given a five-resource-block index. An entire sub-band 404 or only a portion of a sub-band 404 may be used.

In the configuration of one of the UEs in FIG. 4, the UE may be told the number of resource blocks assigned to the UE. The UE may also be configured with a hopping pattern. The UE may further be configured with a reference signal index and a total number of available reference signals. In some embodiments, the total number of available reference signals is predefined and known by both the base station and the UEs. The reference signals may be configured so the reference signals do not collide with one another. That is, if two UEs are configured in the same resource, the UEs may need to use different reference signals.

In an embodiment, the likelihood of a collision between two or more UEs is further reduced by introducing permutations in the positions of the UEs in the groups 406 when a UE moves to a different sub-band 404 in a different time slot 402. For example, UE1 appears in the first position of group 406a in time slot 402a. When UE1 moves to group 406g in time slot 402b, UE1 may appear in the second, third, or fourth position in group 406g instead of in the first position as shown.

In another embodiment, instead of or in addition to grouping UE1, UE6, UE11, and UE16, for example, in group 406a, UEs may be grouped across different sub-bands 404 in a given time slot 402. Such groups for UEs may be designated to share various parameters. For example, UE1, UE2, UE3, UE4, and UE5 may be grouped together and may be designated to share a reference signal and share the same MCS. Such UEs would have different locations in frequency but may have the same cyclic shift and thus would share the same hopping pattern. Such a group of UEs may be signaled to tell the UEs how their resources will be configured.

Note that in all the text of this disclosure, the terminology "UE ID" may represent, but is not limited to, a RNTI, a GF-RNTI or a C-RNTI or a higher layer ID or a UE index within a group (e.g. the UE index among the group signaled in RRC for group_RNTI) or a group ID or group_RNTI or any index for identifying the UE.

The resource hopping pattern may be signaled by a combination of a field of VRB index or PRB index assignment and hopping parameters. In some embodiments, the minimum resource assignment for grant-free may be signaled in terms of VRB or PRB group index, which consists of a predefined number of resource blocks. The VRB, PRB, VRB group, or PRB group index may be indicated by the starting and/or ending RB or RB group index and the number of RBs or the number of RB groups. The time-frequency resource hopping parameters may be represented by the number of resource blocks or the number of sub-bands that are cyclically shifted from the assigned VRBs or PRBs at each time slot within a grant-free frame. The grant-free frame can have as a default length, the frame length used in LTE or new radio (NR), i.e., the grant-free frame can be the frame used in existing and future cellular standard (such as LTE and 5G NR). The GF frame length, which is the periodicity of the hopping pattern, can also be specifically signaled or defined for grant-free transmission (as discussed with regard to the RRC signaling) The UE and base station can then derive the PRB indices assigned at time slot index i, frame index j as $$\text{PRB}'(i,j) = (f(n_{VRB}) + g(i) + f(j) + \text{other terms}) \bmod (N_{RB}) \quad \text{Equation 1}$$

$$\text{PRB}'(i,j) = (\text{PRB}_0 + g(i) + f(j) + \text{other terms}) \bmod (N_{RB}) \quad \text{Equation 2}$$

where the actual physical resource blocks PRB(i, j)=f'(PRB'(i, j) and f'( ) is a predefined mapping function known by both the base station and the UEs. The time slots described herein may be a subframe, a TTI, a mini-slot, a slot, a half slot, a frame, an OFDM symbol, a number of OFDM symbols, or the interval between two grant-free resources, or in general any time interval as described earlier. Therefore, the time slot index i and slot index i described in this disclosure can be a subframe index, a slot index, a TTI index, a mini-slot index, an OFDM symbol index, an index of a half slot, a frame index, a grant-free resource index, an index of grant-free transmission occasions or transmission opportunities, a repetition number index or an index that is a function of a combination of the above indices. In some embodiments, the hopping pattern repeats each frame, and the time slot index can be defined within each frame. For example, if only inter-slot frequency hopping (i.e., frequency hopping between different slots) is supported and intra-slot hopping (frequency hopping between first partition and second partition of a slot) is not supported, time slot index i can be just the slot index within a frame. On the other hand, if both intra-slot and inter-slot hopping is enabled, the time slot index i can be the index of a half slot in a frame, e.g., the index i can be 2×n_s+x, where n_s is the slot index, and x=0 or 1 where 0 represents the first partition of the slot and 1 represents the second partition of the slot. In another example, the time slot index i can be the index representing the number of repetitions. For example, a UE may be configured to perform K repetitions for each transport block (TB). The first transmission of the repetition of the TB corresponds to index i=0, the second transmission repetitions of the TB corresponds to index i=1, ..., and the Kth repetition corresponds to the index i=K−1. In another example, there may be multiple repetitions per slot. For example, $N_{rep}$ represents the number of repetitions per slot. Then, the index i can be i=$N_{rep}$×n_s+x, where x=0, 1, ..., $N_{rep}$−1 is the repetition index within a slot and n_s is the slot index. The above description of the time slot index i can be applied to all the hopping descriptions disclosed in this disclosure, including the subscript i used for g(i), $f_{hop}$ (i), etc. $n_{VRB}$ is a virtual RB index or in general a VRB group index. $f(n_{VRB})$ is a predefined mapping function from assigned virtual RBs (signaled in higher layer signaling (e.g. RRC signaling) or DCI) to the RBs used to calculate PRBs or PRBs of a particular slot or time slot (e.g., at time slot i=0, frame index j=0). $PRB_0$ is an initial PRB index, which can also be signaled in RRC signaling or DCI. The predefined mapping function may be cell-specific and known by the base station and all UEs. An example of such predefined function is given in Equation 3 and Equation 4 in the example given below. g(i) is a sequence representing the number RBs to be cyclically shifted with regard to the assigned resource blocks (VRBs or $f(n_{VRB})$ or $PRB_0$) indexed by the time slot index i. The definition of g(i) may be needed only for index i within a frame or grant-free frame, after which the value of g(i) will repeat, i.e., 0<=i<=I−1, where I is the total number of time slots within a grant-free frame. $N_{RB}$ is the total number of RBs assigned to grant-free transmission, which is used for the cyclic shifting such that no PRBs will be outside the assigned $N_{RB}$ resource blocks. $N_{RB}$ can be predefined, derived, or signaled using broadcast signaling (e.g. system information SIB) or higher layer signaling (UE specific or cell specific RRC signaling) or dynamic signaling f(j) is a function of the frame index j known by both the base station and the UEs. The term f(j) is optional and may or may not exist (e.g., f(j)=0). The existence of f(j) means the hopping pattern may change over frames. In an example, f(j)=j×$N_{RB}^{sb}$ mod M, where $N_{RB}^{sb}$ is the number of RBs in the sub-band and M is the number of frames over which the hopping pattern will repeat. The other terms may be a constant, may be related to other parameters, e.g., a mirroring pattern, and may also be optional (i.e., can be 0).

In some embodiments, g(i) can be explicitly or implicitly signaled, e.g., in higher layer signaling (e.g. via RRC signaling) or DCI signaling. In some embodiments, the sequence of the number of RBs cyclically shifted may be replaced or represented by the sequence of the number of sub-bands to be cyclically shifted. For example, g(i) may be derived from the following:

$$g(i)=f_{hop}(i) \times N_{RB}^{sb}$$

where $f_{hop}(i)$ is the hopping sequence representing the sub-band index the UE hops to at time slot index i.

This reduces signaling overhead because g(i) can take values between 0 and $N_{RB}$−1 and $f_{hop}(i)$ may only take values between 0 and $N_{sb}$−1, where $N_{sb}$ is the number of sub-bands. Then the physical resource blocks may be derived based on the following:

$$PRB'(i,j)=(f(n_{VRB})+f_{hop}(i) \times N_{RB}^{sb}+f(j)+\text{other terms}) \mod(N_{RB})$$

or $$PRB'(i,j)=(PRB_0+f_{hop}(i) \times N_{RB}^{sb}+f(j)+\text{other terms}) \mod(N_{RB})$$

The number of $N_{RB}^{sb}$ is the number of RBs in each sub-band and can be predefined or signaled. For example, it may be signaled in higher layer signaling (e.g., in RRC signaling) or broadcast signaling (e.g., in SIB). $f_{hop}(i)$ represents the number of sub-bands by which the resource hopping pattern will be cyclically shifted or the sub-band index the resource will hop to as a function of time slot index i. $f_{hop}(i)$ may only need to be defined between 0 and $N_{sb}$−1, where $N_{sb}$ is the number of grant-free sub-bands predefined or signaled (in higher layer signaling (e.g., RRC), broadcast signaling (e.g., SIB) or DCI). In some embodiments, the sequence $f_{hop}(i)$, i.e., the subband index at a different time slot, is explicitly or implicitly signaled, e.g., using higher layer signaling (e.g. RRC signaling) or dynamic signaling (e.g. DCI).

In some embodiments, $f_{hop}$ (i) or g(i) may be computed and/or signaled as a pseudo-random sequence as a function of i. In some embodiments, the pseudo-random sequence c(i) represents the number of subbands or resources blocks shifted from ones slot to the adjacent slot, i.e., $f_{hop}(i)$−$f_{hop}(i-1)$ or g(i)−g(i−1). In this case, for a given initial value, $f_{hop}(i)$, g(i) is also a pseudo-random sequence as a function of i. For example, as also described in an example later in this disclosure $f_{hop}(i)=f_{hop}(i-1)+c(i)$, where $f_{hop}(-1)=0$ and c(i) is a pseudo random sequence. The pseudo-random sequence may be UE-specific such that different UEs may have different hopping patterns to avoid persistent collisions. The pseudo-random sequence may be generated using a function of the UE ID or a combination of UE ID and cell ID as a seed or initialized using a function of the UE ID or a combination of UE ID and cell ID. The UE ID may be the GF-RNTI or C-RNTI or a higher layer ID or a UE index within a group (e.g., the UE index among the group signaled in RRC for group_RNTI) or a group ID or group_RNTI or a UE index or a UE hopping index that is used to derive the UE specific hopping pattern. In this scenario, $f_{hop}$ (i) or g(i) may not need to be explicitly signaled, and instead, it can be derived from the pseudo-random sequence. The base station may only need to explicitly or implicitly indicate that the hopping sequence is generated using the pseudo-random sequence. In some embodiments, if the hopping pattern repeats each frame as described earlier, the pseudo random sequence can also be re-initialized in each frame.

In some embodiments, $f_{hop}$ (i) or g(i) may be signaled as a function of the slot index i, based on, for example, $f_{hop}(i)=f_{hop}(0)+(m \times (\text{slot index i})) \mod N_{sb}$, or $f_{hop}(i)=(f_{hop}(0)+(m \times (\text{slot index i}))) \mod N_{sb}$, or $g(i)=g(0)+(m_0 \times (\text{slot index i})) \mod N_{sb}$, where m is the number of sub-bands to be cyclically shifted from one slot to the next slot, and $m_0$ is the number of RBs to be cyclically shifted from one slot to the next slot. Equivalently, m can be defined as m=$f_{hop}(i)$−$f_{hop}(i-1)$. The term $f_{hop}$ (0) and g(0) are the value of the hopping sequences at time slot with index 0. They are optional and can be default at some value (e.g. default at 0). They may be explicitly signaled or derived based on other parameters. For example, they may be signaled via semi-static signaling (e.g., higher layer signaling such as RRC signaling) or dynamic signaling (e.g. via DCI signaling) When $f_{hop}$ (0) and g(0)) are not there or have a default value, in this scenario, only a single value (instead of a sequence as a function of i) m and $m_0$ may need to be signaled. m and $m_0$ can be signaled. In another words, the BS may signal the cyclic shift value m or $m_0$ and optionally the initial subband or RB index to the UE via semi-static signaling (e.g., RRC signaling) or dynamic signaling (DCI). The signaling may be UE specific. In this case, the resource block assignments at different time slots can be derived based on the following:

PRB'$(i,j)=(f(n_{VRB})+m \times i \times N_{RB}^{sb}+f(j)+$other terms$)$mod$(N_{RB})$ or PRB'$(i,j)=(f(n_{VRB})+m_0 \times i+f(j)+$other terms$)$mod$(N_{RB})$ or PRB'$(i,j)=(f(n_{VRB})+g(0)+m \times i \times N_{RB}^{sb}+f(j)+$other terms$)$mod$(N_{RB})$ or PRB'$(i,j)=(f(n_{VRB})+f_{hop}(0)+m_0 \times i+f(j)+$other terms$)$mod$(N_{RB})$ $f(n_{VRB})$ may be replaced by the assigned PRB index $PRB_0$.

A UE may be configured to perform up to K repetitions for grant-free or grant-based transmission of a TB. In some embodiment, the time slot index i or slot index i may be the repetition index (0<=i<=K−1) or grant-free transmission occasion index. In this scenario, the inter-slot hopping described above can also achieve the effect of inter-repetition hopping. The advantage of such inter-repetition hopping is to exploit frequency diversity between repetitions as well as avoid multiple UEs persistently colliding during repetitions. In this scenario, m is the number of subbands cyclic shifted between two adjacent repetitions or two adjacent grant-free occasions and $m_0$ is the number of resource blocks (RBs) shifted between two adjacent repetitions or two adjacent grant-free occasions. m or $m_0$ can be signaled to the UE using semi-static signaling (e.g., RRC signaling) or dynamic signaling (e.g., DCI). $f_{hop}(0)$ and g(0) are the initial sub-band index or RB shifting index for the first transmission repetition of the TB, which can be either optionally signaled by the UE in RRC or DCI signaling or can be default to a fixed value (e.g., 0) without signaling.

The signaling based on m and $m_0$ provides a subset of possible hopping patterns in comparison to signaling of the sequence $f_{hop}(0)$, which further saves signaling overhead. The resource hopping patterns of 20 UEs in the example of FIG. 4 can all be signaled using m and $m_0$.

In some embodiments, $f_{hop}(i)$, g(i), m or $m_0$ may be a function of a type of UE ID. The UE ID may be the GF-RNTI or C_RNTI or a higher layer ID or a UE index within a group (e.g., the UE index among the group signaled in RRC for group_RNTI) or a group ID or group_RNTI or a UE index used to determine the resource/RS location and hopping pattern (e.g., in FIG. 4, the UE index in the figure may be an index that is used to derive the resource and resource hopping pattern, and it can be signaled by the BS in higher layer signaling, DCI signaling or broadcast signaling) The function may be known by both the base station and the UE. In such a case, $f_{hop}(i)$, g(i), m or $m_0$ may not need to be explicitly signaled and UE can derive m or $m_0$ from UE ID. In some embodiments, m may be derived as (UE ID+constant) mod $N_{sb}$. For example, in FIG. 4, assuming UE1, UE6, UE11, and UE16 are being configured with the same group ID and have each being configured a UE index within the group as 1, 2, 3, and 4, respectively. Then based on m=(UE ID+constant) mod $N_{sb}$, assuming constant=0, and $N_{sb}$=5 in FIG. 4, then the system would have m=1, 2, 3, 4 respectively for UE1, UE6, UE11, and UE16. This means that UE1, UE6, UE11, and UE16 will cyclically hop 1, 2, 3, 4 subbands from one time slot to the next time slot, which is the same as the hopping rule defined in FIG. 4. In this example, the UE ID is the UE index among the group where the group of UEs share the subband index at time slot 0. In some embodiments, the group ID and the UE index within the group may be derived from a single assigned UE index for hopping pattern derivation that is signaled in RRC or DCI signaling. In some embodiment, the initial sub-band index (e.g., $f_{hop}(0)$ or g(0), and the cyclic shift value (e.g., m or $m_0$) may be derived from a single assigned UE index for hopping pattern derivation that is signaled in RRC or DCI signaling.

In some embodiments, a UE may be assigned a UE ID, which is the UE index used to calculate the resource hopping pattern. The UE index may be signaled in RRC signaling or DCI signaling. For example, this UE index may be the same as the numbers shown in FIG. 4. Each UE may calculate the hopping pattern sequence $f_{hop}(i)$ as a function of the UE index assigned. The sequence may be calculated in the following way, $f_{hop}(i)=f_{hop}(0)+m' \times i$ or, $f_{hop}(i)=(f_{hop}(0)+m' \times i)$ mod $N_{sb}$, where $f_{hop}(0)$ is the sub-band index at time slot 0; m' is the cyclic shift of sub-bands from one slot to the next slot (i.e., the same as m described before). In some embodiments, $f_{hop}(0)$ and m' may be explicitly signaled. In some embodiments, they are derived from some UE IDs based on, for example, $f_{hop}(0)=$(UE ID+C1)mod $N_{sb}$ and $$m' = \left\lfloor \frac{UE\ ID + C2}{N_{sb}} \right\rfloor + C3,$$

where C1, C2, and C3 are values that are common to all the UEs in the same frame and same cell. If C1=C2=−1, C3=1, the hopping pattern obtained from $f_{hop}=fhop(0)+m' \times i$, or $f_{hop}(i)=(f_{hop}(0)+m' \times i)$ mod $N_{sb}$ will be the same as the hopping rule defined in FIG. 4 (assuming the UE ID is the integer number shown in the figure). In some embodiments, $f_{hop}(0)$ may be derived as a function of the group ID, and m' is derived as a function of the UE index among the group. For example, if the groups 406a, 406b, . . . , and 406e are assigned with a group ID as 0, 1, 2, 3, 4, and UE index is assigned based on the order of the numbers shown in the figure. Then, if the system has $f_{hop}(0)=$(group ID) mod $N_{sb}$ and m'=UE index among the group, the UE can also derive the same hopping rule as shown in FIG. 4. In both cases, RS may be explicitly configured or derived as a function of the UE ID, e.g. RS equals to m' or a function of m', which is a function of UE ID, or $$RS = \left\lfloor \frac{UE\ ID + C2}{N_{sb}} \right\rfloor + C3.$$

In this case there will be no RS collision at the same resources.

In some embodiments, the RS parameters are derived from the signaled cyclic shift value m', e.g., RS=(m'+C4) mod $N_{RS}$, where $N_{RS}$ is total number of RS index and C4 is a constant. In some other embodiments, the RS parameters are explicitly signaled in semi-static (e.g., RRC) or dynamic (e.g., DCI) signaling Some or all of the hopping pattern/parameters or hopping sequence may be derived from the RS parameters. For example, the UE specific RRC signaling may indicate the RS parameters (e.g. an RS index) and optionally the initial subband index, while the cyclic shift value m or m' may be derived using the assigned RS parameters, e.g., m'=(RS Index+C5)mod $N_{sb}$, where C5 is an integer. An example of RS index is the cyclic shift and OCC index used in LTE.

In some embodiments, when the CTU size is predefined or fixed, the VRB index in Equation 1 may be replaced by a CTU index in a particular time slot (e.g., CTU_0 representing CTU index at time slot 0 and frame 0). The derived PRB index in Equation 1 may be replaced by the CTU index at time slot index i and frame index j. In some embodiments, CTU_0 may be explicitly or implicitly signaled. In some embodiments, CTU_0 may be derived from a UE ID or group ID (e.g., GF-RNTI, C-RNTI or group_RNTI) based on, for example, CTU_0=group_RNTI mod (number of CTUs in a time slot).

In some embodiments, when the CTU size is fixed or known to the UE, the VRB index may not need to be explicitly signaled. For example, if the number of RBs in a CTU is fixed at 5, then $n_{VRB}$ may default at VRB index {0, 1, 2, 3, 4} as if the VRB index {0, 1, 2, 3, 4} are signaled.

In some embodiments, the RS index used for a UE may be fixed for a UE and can be explicitly signaled. In an embodiment, the reference signal used by a UE when the UE hops to a different sub-band in a subsequent transmission changes from the reference signal used in a previous transmission. The hopping pattern may be a function of time locations and may be cell-specific (or common for the UEs in the same cell). So, if a fixed RS assignment does not result in RS collision, the hopped assignment also does not result in any RS collision. In an embodiment, the reference signal used in a subsequent transmission is given by the equation RS(i,j)=RS$_0$+(slot index i)+(frame index j)mod $N_{RS}$ where RS(i,j) is the reference signal used in a subsequent transmission, RS$_0$ is the reference signal used in a particular slot (e.g., slot index 0 and frame index 0), and $N_{RS}$ is the total number of reference signals assigned. In another example, the slot index i and frame index j may be replaced as a pseudo-random sequence as a function of i and the sequence can be initialized using a cell ID. RS$_0$ can be explicitly signaled, e.g., in a DCI or group DCI or RRC signaling. In some embodiments, RS$_0$ can also be implicitly derived as a function of UE ID, where the UE ID may be the GF-RNTI or C-RNTI or a higher layer ID or a UE index within a group (e.g., the UE index among the group signaled in RRC for group_RNTI) or a group ID or group_RNTI. All the RS index signaling methods described in this disclosure may be applicable or can be generalized to MA signature assignment.

In some embodiments, the resource hopping pattern $f_{hop}$(i) may be derived from a pseudo-random sequence. However, instead of being based on a UE-specific pseudo-random sequence, the pseudo-random sequence may be group-specific. In some embodiments, instead of considering UEs sharing the same resource as a group, UEs may be grouped based on re-use of the same RS signal. These UEs may not be transmitting at the same resources at the same time. Each group may share the same group ID and UEs within a group may have a different UE index among the group. The group ID and UE index may be explicitly signaled, e.g. in RRC signaling, or implicitly calculated (e.g. calculated as a function of a single UE ID that may be signaled to the UE). For example, in FIG. 4, UE 1, UE2, UE3, UE4, and UE 5 may be grouped into one group with a group ID=0, UE 6, UE7, UE8, UE9, and UE10 belongs to another group with a group ID=1, . . . etc. The UE index may be determined from the lower number to the higher number in the same group. The sizes of the resources that UEs access within the same group can be different, which is not shown in the figure, but the UEs may share some properties, e.g. the same subband index at one slot. The hopping pattern $f_{hop}$(i) may be computed as follows: each group of UE may perform a pseudo-random permutation at each time slot and mapped to the subband one-by-one based on the permutation pattern. For example, if the permutation pattern is {5, 1, 2, 3, 4} at a time slot, the hopping pattern may be the same as the time slot 402b in FIG. 4 for UE1, UE2, UE3, UE4, and UE5. The pseudo-random permutation is the same for all the UEs within a group but may be different for UEs in different groups. This can be done by using pseudo-random sequence to represents different permutation patterns. For example, there are $N_{sb}$! possible different permutation patterns, therefore, we can generate a pseudo-random sequence to take an integer value uniformly at random from between 0 and $N_{sb}$-1, which represents all possible permutation patterns. There are many different ways to generate a pseudo-random sequence. An example of pseudo random sequence generation can be found in clause 7.2 in 3GPP TS 36.213. The pseudo-random sequence can be generated using a seed or initialized as a function of group ID. Therefore, UEs from the same group will have the same permutation pattern. After determining the permutation pattern based on the pseudo-random number initialized as a function of group ID, the UE can determine the sub-band location of the hopping pattern $f_{hop}$(i) based on the UE index among the group and the permutation pattern. The RS may be explicitly signaled or implicitly derived. In some embodiments, the RS can be derived as a function of the group ID based on, for example, RS=(group ID+common term) mod (total number of RSs). The common term is optional and means a term that is the same for all UEs in the same cell, e.g., it can be a function of frame index, time slot index, etc. If the group ID is set to be continuous integers and there are fewer groups than the number of RS index, then there will be no RS collisions. In some embodiments, the group ID and UE index from the group ID can be derived from a single UE ID. The UE ID may be signaled to each UE for resource configuration (e.g. in RRC or DCI). The UE ID can be a GF-RNTI, C-RNTI, a higher layer ID, a UE index for calculating GF resources as shown in the FIG. 4, etc. For example, if the UE ID is the UE index shown in FIG. 4, the group ID and UE index within the group may be derived as group $$ID = \left\lfloor \frac{UE\ ID + C2}{N_{sb}} \right\rfloor + C3$$

and UE index among the group=(UE ID+C1) mod $N_{sb}$; if we take C1=C2=-1, C3=0; in FIG. 4, we can obtain for UE1, UE2, UE3, UE4, UE5 in the same group with group ID=0 with UE index 0, 1, 2, 3, 4 respectively. UE6, UE7, . . . , UE10 belongs to group with group ID=1. In this way, the hopping pattern $f_{hop}$ (i) and RS may be derived from a single UE ID without other signaling and UEs in the group can re-use the same RS. The UEs belonging to the same group may also be configured using the group signaling, e.g. a group DCI, in which case, the group ID and UE index among group may be configured, e.g., in RRC signaling. The UEs may share the RS, VRB index, which can be signaled in group DCI. The hopping pattern of UEs within a group is different, which can either be generated using the above random permutation method. In some other embodiments, the hopping pattern may be explicitly or implicitly signaled or through deriving $f_{hop}$ (0)) and m' and $f_{hop}$(i)=$f_{hop}$(0)+ m'×i or $f_{hop}(i)=(f_{hop}(0)+m'\times i) \mod N_{sb}$, where $f_{hop}(0)$ is a function of UE index among the group (e.g. $f_{hop}(0)$=(UE index among the group) mod $N_{sb}$ and m' is a function of the group ID (e.g. m'=(group ID+C) mod $N_{sb}$).

In some embodiments, the hopping pattern may be derived using the signaled RS parameters, e.g. using RS index signaled in semi-static (e.g. RRC signaling) or dynamic signaling (e.g. DCI signaling). The hopping sequence (e.g., $f_{hop}(0)$) may be derived using a pseudo random function initialized by at least the signaled RS parameters. For example, the hopping sequence may be a pseudo random function with a seeds as a function of the RS parameters. The initialization may also depends on other parameters, e.g., a UE ID and/or cell ID, in addition to the RS parameters.

In some embodiments, there may be a predefined rule table (e.g. like FIG. 4) to map a UE index to the hopping pattern. The rule table may be known by both BS and UEs. The UE can derive the hopping pattern based on the mapping between UE index and resource hopping pattern and/or RS/RS hopping pattern. The UE index may be signaling (e.g. in RRC or DCI) or is predefined/known by the UE.

In some embodiments, the resource may be configured/partially configured or updated by group or multicast signaling, e.g., through group DCI, as in the examples shown in FIGS. 3A and 3B. Throughout this disclosure, group DCI may also refer to a common DCI, group common DCI or a group common PDCCH, a group common NR-PDCCH, a DCI to a group of UEs, or just a downlink control channel targeting to a group of UEs. The resource may also be configured in some other slow type (non-dynamic) of multicast signaling, e.g. a group RRC (RRC targeting to a group of UE). In some embodiments, the group of UEs may be associated with the same resource at a given subframe. For example, UE1, UE6, UE11, and UE16 may share the resource 406a. In some embodiments, the group of UEs may be associated with all the potential UEs accessing the GF resource in one time slot. The group of UEs may be signaled a common group ID (e.g., group_RNTI) and a UE-specific UE index among the group, e.g., in RRC signaling. The UE index may be different for different UEs in the same group. When sending a group DCI, the group ID (or group_RNTI) is used to define the search space of the DCI signal and CRC is scrambled using the group_RNTI. In some embodiments, the search space of the group common DCI may be in a common search space. A UE can use the group_RNTI to decode the CRC and knows that the group DCI is targeting the group the UE belongs to. The group of UEs may be signaled a common VRB index or PRB index (PRB$_0$), a common MCS value, new data indicator (NDI), and redundancy version (RV) etc. in the group DCI. However, the hopping pattern and RS value of a UE may be different for different UEs in the group, and the hopping pattern can be associated with the UE index of the group, which may have been previously configured in the RRC signaling. In a more particular example, the m value may be a function of the UE index of the group, e.g., =(UE index among the group) mod $N_{sb}$ or m=(UE index among the group+constant) mod $N_{sb}$. In another example, the group signaling may explicitly signal $f_{hop}(0)$ and the hopping parameters m' may be derived as a function of UE index of the group, e.g., m'=(UE index among the group) mod $N_{sb}$ and $f_{hop}(i)=f_{hop}(0)+m'\times i$. $f_{hop}(0)$ may also be possibly not signaled and take a default value, the default value may be 0. In this case, the hopping pattern does not need to be explicitly signaled for each UE of the group. The RS value can also be associated with the UE index among the group. For example, RS can be derived as a function of the UE index among the group, so different UEs in the same group may use different RSs, e.g., RS index=(RS index configured+UE index)mod(total number of RS index) or RS index=(UE index)mod(total number of RS index). The RS index configured can be optional. In some embodiments, for resource update or configuration/reconfiguration using the group DCI, the hopping pattern may be derived using the pseudo random sequence initialized by at least a UE ID, RS parameters, cell ID, or any combination of them.

In some embodiments, the group_RNTI and UE index among the group configured in RRC signaling may also be used for group ACK/NACK, resource/MCS update through a group DCI. The group DCI may be a group common NR-PDCCH. The group_RNTI and UE index used for group ACK/NACK, MCS update, and resource update may be the same or different from the group RNTI and UE index configured for GF resource configuration.

As an example of the use of Equation 1, the number of resource blocks, $N_{RB}$, may be 25, the PRB index may range from 0-24, the periodicity may be 2, (that is, there may be two time slots per access opportunity), and a frame may be 10 milliseconds. Further, returning to FIG. 4, sub-band 404a may have a PRB index of 0-4, sub-band 404b may have a PRB index of 5-9, sub-band 404c may have a PRB index of 10-14, sub-band 404d may have a PRB index of 15-19, and sub-band 404e may have a PRB index of 20-24. UE14, as an example, is in group 406d in time slot 402a and thus has a PRB index of 15-19 in time slot 402a. If UE14 has been given a cyclic shift value of m=3 and the number of resource blocks per sub-band is $N_{RB}^{sb}$=5, UE14 will shift by 3 multiplied by 5 from one slot to the next slot, so UE14 will have a cyclic shift of 15 from one slot to the next slot. That is, the UE-specific cyclic shift value for UE14 is $m_0$=15= (3*5). Thus, at time slot 402d, the PRB index for UE14 becomes (15+15*3+0)mod(25), which equals 10. So in time slot 402d, which is a cyclic shift of 3 away from time slot 402a, UE14 will have a PRB index of 10-14 and will therefore use sub-band 404c and be in group 406r.

A resource hopping pattern may be defined by VRB or PRB assignment at one time slot and by a resource hopping parameter. In an embodiment, the resource hopping parameter is explicitly signaled by the base station. In another embodiment, the resource hopping parameter is indicated by the specific sub-band index at a different time unit. In another embodiment, the resource hopping parameter is configured using a cyclic shift value with respect to the time unit and optionally the initial sub-band index. In another embodiment, the resource hopping parameter is indicated by the sub-band index derived from a pseudo-random sequence. The pseudo-random sequence may be UE-specific. For example, the pseudo-random sequence can be initialized as a function of UE ID. The pseudo-random sequence may include a cell ID as well. The pseudo-random sequence can also be initialized as a function of RS index. The following provides a detailed example of configuration and derivation of a resource hopping pattern from an assigned VRB index and hopping sequence. However, the actual equations/rules for the resource hopping pattern may be varied.

If uplink frequency hopping with a predefined hopping pattern is enabled, the set of physical resource blocks to be used for transmission in slot $n_s$ is given by the VRB assignments in DCI or RRC signaling together with a predefined or signaled pattern according to the following equations.

$$\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i))$$
$$\bmod (N_{RB}^{sb} \cdot N_{sb})$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

where $n_{VRB}$ is obtained from the resource block assignment explicitly signaled in DCI or RRC signaling. The parameter pusch-HoppingOffset, $N_{RB}^{HO}$, is provided by higher layers. $\tilde{n}_{VRB}$ is a virtual resource block assignment. $f_{hop}(i)$ designates which sub-band to hop to. The above random sequences are initialized with a function of the UE ID in order to make the hopping UE-specific. In some embodiments the UE ID alone is used, and in some embodiments the UE ID is used together with the cell ID. The mapping function f'( ) and f( ) used in this example is given by $$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases} \quad \text{Equation 3}$$

and $$\tilde{n}_{VRB} = \begin{cases} n_{VRB} & N_{sb} = 1 \\ n_{VRB} - \lceil N_{RB}^{HO}/2 \rceil & N_{sb} > 1 \end{cases} \quad \text{Equation 4}$$

In the example, the size $N_{RB}^{sb}$ of each sub-band is given by $$N_{RB}^{sb} = \begin{cases} N_{RB}^{UL} & N_{sb} = 1 \\ \lfloor (N_{RB}^{NL} - N_{RB}^{HO} - N_{RB}^{HO} \bmod 2)/N_{sb} \rfloor & N_{sb} > 1 \end{cases}$$

The number of sub-bands $N_{sb}$ is given by higher layers. The function $f_m(i) \in \{0, 1\}$ determines whether mirroring is used or not. The mirroring pattern terms may be optional. The parameter Hopping-mode provided by higher layers determines if hopping is inter-subframe or intra and inter-subframe.

The hopping function $f_{hop}(i)$ and the function $f_m(i)$ are given by $$f_{hop}(i) = \begin{cases} 0 & N_{sb} = 1 \\ \left(f_{hop}(i-1) + \sum_{k=i\cdot10+1}^{i\cdot10+9} c(k) \times 2^{k-(i\cdot10+1)}\right) \bmod N_{sb} & N_{sb} = 2 \\ \left(f_{hop}(i-1) + \left(\sum_{k=i\cdot10+1}^{i\cdot10+9} c(k) \times 2^{k-(i\cdot10+1)}\right) \bmod (N_{sb}-1) + 1\right) \bmod N_{sb} & N_{sb} > 2 \end{cases}$$

$$f_m(i) = \begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

$f_{hop}(1) = 0$ and the pseudo-random sequence c(i) are given by clause 7.2 in 3GPP TS 36.213. CURRENT_TX_NB indicates the transmission number for the transport block transmitted in slot $n_s$. The pseudo-random sequence generator may be initialized with $c_{init} = f(N_{ID}^{cell}, \text{UE\_ID})$, or $c_{init} = f(N_{Id}^{cell})$.

In the example, $f_{hop}(i)$ may also be explicitly signaled or signal a value m where $f_{hop}(i) = (m \times i) \bmod N_{sb}$, or $f_{hop}(i) = (m \times i) \bmod N_{sb} f_{hop}(0)$ or $f_{hop}(i) = ((m \times i + f_{hop}(0)) \bmod N_{sb}$.

In some embodiments, there may be a single hopping pattern field in the signaling, where some value of the field is referring to a hopping sequence generated using a UE-specific or group-specific pseudo-random sequence. Some other values may represent explicit signaling of the hopping pattern. For example, it may explicitly signal m or $f_{hop}(0)$ and m'.

Note that although all the hopping pattern configuration, derivation and signaling methodology are described based on hopping over different frequency, e.g. in different band or subband. The same methodology/mechanism/signaling may be applicable to a hopping over resources at different time slot or hopping at resource in a combination of different frequency bands and different time slots. A subband described in this disclosure can represent any frequency partitions, such as a subband, a carrier, a subcarrier, a bandwidth part, a resource block or a resource block group, a number of subcarriers, a number of resource blocks, and a resource block group.

A base station may send signaling to a grant-free UE indicating the time and frequency resources the UE is to use in grant-free uplink transmissions. In an embodiment, the signaling includes a resource block index (PRB index of UE-specific grant-free resources at time slot 0 and frame 0 or VRB index), for example. The resource block index may specify the beginning and ending of a resource block, or may specify the beginning and the number of resource blocks, or may specify a specific resource block index. Such signaling may be done in RRC signaling or in DCI, and may include an initial PRB or VRB index. The signaling may further include a reference signal index, which may be indicated for one time slot and which may hop over time. Such signaling may be done in RRC signaling or in DCI and may include an initial reference signal index. Alternatively, the reference signal index may be implicitly signaled according to the index of a UE among a group. The signaling may further include a UE-specific cyclic shift value between two time slots. Such signaling is one way to designate a hopping pattern. Such signaling may be done in RRC signaling or in DCI. More generally, the signaling may include a UE-specific hopping pattern $f_{hop}(i)$, where i is a slot index. The signaling may further include a total number of grant-free resources ($N_{RB}$) or a number of sub-bands ($n_{sb}$). The number of RBs in each sub-band or CTU size may be signaled or derived from $N_{RB}$ and $n_{sb}$. Such signaling may be broadcast signaling or higher layer signaling, for example in the SIB or RRC signaling. The signaling may further include a number of resource blocks in each sub-band ($N_{sb}$). Such signaling may be broadcast signaling, for example in the SIB. The signaling may optionally include a periodicity of the hopping pattern, which is the number of time units between frames, with a default at each frame. Such signaling may be done in RRC signaling. The signaling may also optionally include a time interval between two grant-free regions (or a periodicity), with a default at one TTI. That is, multiple resource regions may be configured over time, and the time interval may designate how many slots are present and the time between the slots, such as the time slots 402 in FIG. 4. Such signaling may be done in RRC signaling.

In an embodiment, a base station may explicitly signal to a UE an amount, $f_{hop}$ (0 or g(i)), by which the UE is to hop from one sub-band to another. In an embodiment, $f_{hop}$ (i) or g(i) is a function of a UE index m based on the following equations:

$$f_{hop}(i) = m \times (\text{slot index}) \bmod (\text{total number of sub-bands})$$

$$g(i) = m \times (\text{slot index}) \times N_{RB}^{sb} \bmod (\text{total number of RBs})$$

A resource hopping parameter designates which resource blocks are to be used and which hopping parameter is to be used. In the resource hopping parameter, the base station may explicitly designate which sub-band a UE is to hop to. The base station may also designate how many resource blocks a UE is to shift by in the next slot.

In an embodiment, a configuration or update of the resources to be used by a plurality of grant-free UEs in the coverage area of a cell is achieved through multicast signaling to groups of UEs in the cell, such as the groups 406 of FIG. 4. The multicast signaling may configure resources for a group of UEs at the same time. The group of UEs may share the same grant-free resources at one TTI. In an embodiment, the group of UEs share the same grant-free resources at one particular slot of the frame (e.g., time slot index 0) or the same initial transmission. The multicast signaling can be implemented by a group common DCI or by slow multicast signaling. The multicast configuration signaling may include the initial grant-free resources common to the group of UEs or the common resources at a given TTI. The signaling may further include reference signal parameters that may not be common to a group. A reference signal index can be implicitly signaled according to the index of a UE among the group. The signaling may further include a resource hopping pattern for different time slots or for repetition/retransmission. The resource hopping pattern may be different for each UE in a group and may also be implicitly signaled according to a UE index among the group.

Furthermore, the multicast signaling may be done using a group common NR-PDCCH or a group DCI. The group DCI resource configuration may be performed as follows. A group common DCI search space may be defined by a group Radio Network Temporary Identifier (RNTI), and a cyclic redundancy check (CRC) may be scrambled by the group RNTI. In the group DCI, a resource block assignment may be made for an initial transmission or for a given time slot for all the UEs within the group. Reference signal parameters (such as a cyclic shift value) may be configured for a given time slot or for the initial transmission for a UE with index 0. Indices for other UEs may be derived using the UE index among the group, such that no two UEs have the same reference signal in the same resource based on, for example, RS index=(RS index configured+UE index)mod(total number of RS index) or RS index=UE index mod (total number of RS index). If the RS index is defined only in terms of the UE index, the RS index does not need to be explicitly signaled. A reference signal for other time slots may be derived from a given time slot. In addition, a resource hopping pattern may be configured. A UE-specific resource hopping pattern may be determined by a UE index based on, for example, m=UE_index mod $N_{sb}$.

In an embodiment, unicast RRC signaling may be used to configure a group_RNTI for a group common DCI and to configure a UE index in the group RNTI.

In an embodiment, resource configuration is performed only for an initial transmission, and retransmission resources are not configured. Retransmission resources may rely on grant-based transmissions.

In some embodiments, grant-free initial transmission resources and retransmission/repetition resources are configured separately. As described in more detail below, grant-free transmissions may be configured to perform repetitions a defined number of times, K. The maximum number of repetitions may be configured. A UE may stop the repetitions before the maximum is reached if the UE receives an ACK. In this scenario, grant-free retransmission resources can be configured using a resource hopping pattern.

In other embodiments, grant-free initial and retransmission resources are configured together. In such a case, a UE can use any of the configured grant-free resources for initial transmissions and retransmissions.

In an embodiment, two types of grant-free resources are configured. Type 1 resources are cell-specific and are configured using broadcast signaling UEs can access Type 1 resources without further configuration. Type 2 resources are UE-specific and are configured using a combination of broadcast signaling and unicast/multicast signaling UEs can access the resources only after the unicast/multicast configuration. Type 1 resource can be used for UEs in an idle or inactive state, but UEs in other states, e.g., active state, are not precluded from using Type 1 grant-free resources. Type 2 resources can be used only for UEs in an active state. Type 1 resources and Type 2 resources can overlap or can be completely separate. Type 1 resources can be configured in the system information block (SIB), which may contain information on the location of time/frequency resources/resource pools and a reference signal pool. Type 2 resources can be configured in the SIB plus RRC signaling, where the SIB contains common resource information, such as total number of resource blocks and a sub-band size for hopping, and where the RRC signaling contains a UE-specific resource allocation. A reference signal/multiple access signature can be randomly selected by the UEs from a reference signal pool for Type 1 grant-free resources and can be semi-statically preconfigured for Type 2 grant-free resources.

A difference between the two types of resources is that for Type 1, information is received only in the broadcast signaling, and a UE can access the resources without any UE-specific configuration. A Type 2 resource can only be used for a UE in the active state. For a UE to obtain resources, the UE first needs to receive configuration information from RRC signaling. Type 1 and Type 2 resources may be separated in the time/frequency domain. As an example, there may be a pool of 100 reference signals/MA signatures and, for Type 1 grant-free resources, the UE may randomly select one of the reference signals/MA signatures. For a Type 2 UE, the MA signature/reference signal may be semi-statically configured. A reference signal may be assigned and a potential resource may be associated with the reference signal.

For Type 1, a UE can decode the SIB information before the UE directly transmits grant-free data without waiting for or relying on any of the UE-specific resource configuration information. A Type 1 UE relies on SIB, which the UE can decode immediately, without having any cell association. That is, for Type 1, all the needed resources (including time-frequency resources, MA signature/reference signal resources, and MCS) are available. A Type 1 UE can know to begin using resources by randomly choosing from the pool of reference signals. A Type 1 UE does not need to be told which specific resources to use. Type 2 signaling gives an individual UE a specific configuration.

In an embodiment, grant-free resources for a UE are configured in different time slots, where the resources are indicated using one or more of an access interval/periodicity of grant-free resources, a time/frequency location of a grant-free resource in a given slot, a resource hopping pattern, and, optionally, a periodicity of repetition of the resource hopping pattern. The size of the time/frequency location of the grant-free resource configured can be UE-specific and may not be the same among all grant-free UEs. The hopped resources may be configured using a resource hopping pattern that can be used for both initial transmission and retransmission or used for retransmission only. The resource hopping pattern can include two types. Type 1 is an explicit configuration of a UE-specific hopping pattern. Type 2 is a pseudo-random hopping pattern that is UE-specific. The resource configuration may be signaled using broadcast signaling plus RRC signaling or using broadcast signaling plus RRC signaling plus DCI. In the Type 1 resource hopping pattern, the PRB index can be derived as a function of one or more of the VRB index of one time slot that is explicitly configured or signaled, or a number of PRBs or sub-bands cyclically shifted from one time slot to next time slot. The number of PRBs cyclically shifted from one time slot to next time slot can be calculated as an integer index m multiplied by the number of resource blocks of a grant-free sub-band (Nsb), where Nsb can be configured in SIB. The index m is configured to be different for UEs that share common resources within a grant-free sub-band. In the Type 2 resource hopping pattern, the PRB index can be derived as a function of the VRB index of one time slot that is explicitly configured or signaled. Additionally or alternatively, a number of PRBs cyclically shifted from one time slot to next time slot is computed as a function of a pseudo-random sequence that changes at each time slot, where the pseudo-random sequence is initialized as a function of UE ID. Thus, each UE uses a different pattern of pseudo-random hopping. This is in contrast to LTE grant-free scenarios, where hopping is cell-specific and the UEs in a cell use the same pattern because the pattern is initialized on the cell ID. In some embodiments, whether type 1 or type 2 resource hopping pattern is used is configurable, e.g., using semi-static (e.g. RRC) or dynamic (e.g. DCI) signaling. In some embodiment, type 1 or type 2 resource hopping pattern may be a part of hopping index signaled to the UE for hopping pattern derivation.

Configuration of reference signal parameters can be derived as a function of one or more of an initial reference signal value explicitly configured or signaled or the reference signal hopping as a function of time slot or frame index, where the hopping pattern is the same for UEs that share common grant-free resources in a given time slot.

In an embodiment, multicast signaling is used to configure or update a grant-free resource allocation to a group of UEs, where the resource allocation includes time/frequency resources, reference signal parameters, an MCS, and a periodicity. The time/frequency resources for one given time slot are configured commonly for all UEs. The reference signal and resource hopping pattern are a function of a UE index among the group. A new reference signal may be determined based on a configured reference signal according to RS=(configured RS+UE index)mod(total number of reference signals).

A resource hopping pattern may be used, where a cyclic shift value, m, is a function of a UE index (m=$f$(UE_index)). The multicast signaling may be configured using a group common DCI. In the RRC configuration, a grant-free group RNTI and a UE index among the grant-free group are configured. In the group common DCI, a grant-free group RNTI is used for defining the search space and scrambling the CRC. The reference signal, MCS, and time resources are configured to be the same among the group, and the initial frequency resource and the resource hopping pattern are different among the group. The frequency resources of different UEs in the group are mapped to a different frequency partition (sub-bands) for each time slot. The location of the sub-band index of a UE is implicitly indicated by a UE index among the group. In some embodiment, the hopping pattern is implicitly calculated based on a pseudo-random permutation pattern that changes each time slot. The pseudo-random pattern is group-specific (e.g., with a seed initialized with a group RNTI).

There may be multiple bandwidth parts (BWPs) configured for each grant-free UE. One or more number of BWPs can be active at each time slot. The resource hopping pattern or frequency hopping pattern can be configured for each bandwidth part (BWP). The hopping may be defined within one BWP, i.e., the frequency sub-band the UE hops to at different time slot belongs to the same BWP. In some other embodiments, the frequency hopping pattern can be defined for different BWP, i.e., UE may hop to different BWP at different time slot. As mentioned above, a UE may be configured to repeat a grant-free transmission a defined number of times, K. Methods for determining an appropriate value for K will now be considered.

Current techniques for determining K are cell-based, and K may be determined by a latency boundary. For example, for URLLC, K can be configured as 6 slots for a 60 kHz numerology slot-based framework.

In an embodiment, K is made to be UE-specific to improve performance. That is, each of the UEs in a plurality of UEs in the coverage area of a cell is assigned a K value based on different values of parameters associated with the UEs. For example, K values may be assigned based on a UE's location within the cell, based on signal conditions experienced by the UE, or based on combinations of such UE-specific parameters. Making K UE-specific reduces unnecessary repetitions for some UEs and helps avoid unnecessary ACKs for early repetition stoppage. In an embodiment, K is based on a UE's channel conditions or measurements. A UE can be configured with a single K, or multiple K values may be used for a single UE. The configuration of K can be semi-static or dynamic as needed.

In an embodiment, given a UE's long-term channel measurements and reliability and/or latency requirements, K may be chosen to satisfy any of several conditions. Among the conditions to be considered are associated factors such as sub-band size, resource allocation size, numerology, slot/mini-slot structure, MCS, and application/traffic types. That is, different K values may be used for different numerologies, different K values may be used for different slot types, and different K values may be used for different resource allocation sizes.

K may need to satisfy latency requirements (if any), so K may be less than or equal to a latency related threshold. For example, K=6 for a 60 kHz slot frame structure. K may also need to be minimized. The K repetitions may need to achieve a reliability requirement as needed. For example, taking an offline simulation signal-to-interference-plus-noise ratio (SINR) to block error rate (BLER) table, for an estimated SINR, the smallest K can be estimated, with optionally some margin to be conservative.

In an embodiment, a UE is configured with multiple K values, which may allow the UE to adapt to channel and environment variations and/or mobility changes. That is, if a UE changes locations or experiences a change in channel conditions, the UE may select one of its multiple values of K as appropriate for the changed location or changed channel conditions. For example, a UE may select a lower value of K when near a cell center and may select a higher value of K when near a cell edge. Alternatively or additionally, a UE may select a lower value of K when channel conditions are relatively good and may select a higher value of K when channel conditions are relatively poor. The base station may blindly detect the different values of K repetitions. Alternatively, the UE may signal the base station to inform the base station which K value the UE is using.

When a single UE-specific K value is used, K can be set conservatively enough to achieve the relevant requirements. HARQ signal combining can be performed on some or all of the K repetitions. Optionally, the K repetitions can be terminated by an ACK message from the base station or by a UL grant message from the base station. In cases where one occasion with K repetitions fails, retransmission of the failed packet can be made. In such a case, another occasion with K repetitions can be implemented, or a different number M (M≠K) of the repetitions may be made. HARQ signal combining can be performed on some or all of the repetition/retransmission signals.

When multiple UE-specific K values are used, the base station may continue to detect and decode the UE repetition signals until the maximum K is reached. HARQ signal combining may be performed on some or all of the K repetitions. For each of the K values, the base station can optionally provide feedback to the UE. Optionally, the K repetitions can be terminated by an ACK message from the base station or by a UL grant message from the base station.

In an embodiment, a UE can signal, explicitly or implicitly, to the base station to indicate to the base station the K value or values the UE is using. For example, the UE may use different resource allocations and/or sizes to map to different K values. Alternatively, the UE may use different reference signals to indicate different K values.

A UE may signal a K value to a base station using a semi-static signaling configuration. A semi-static signaling configuration may be beneficial in reducing signaling overhead.

Alternatively, a UE may signal a K value to a base station using dynamic signaling Dynamic signaling may be beneficial in a fast update situation, for example for fast mobile UEs.

In an embodiment, a UE can determine an appropriate K value based on measurements related to communications engaged in by the UE. For example, during a UE's initial network entry, a base station typically makes network-based UL measurements on the initial transmission signals, such as signal strength and SINR. A UE may receive such measurement results and use the results to determine an appropriate K value. Alternatively or additionally, a UE can use its downlink measurements such as Reference Signal Receive Power (RSRP) and Channel Quality Indicator (CQI) to determine an appropriate K value. Base station background noise and interference level measurements may also be taken into account in determining an appropriate K value.

FIG. 5 illustrates an exemplary flowchart of an embodiment method 500 for grant-free (GF) transmissions. Method 500 starts at step 502, where a user equipment (UE) may receive a Radio Resource Control (RRC) signal. The RRC signal may specify at least one UE-specific GF radio network temporary identifier (GF-RNTI). The UE-specific GF-RNTI is different from a cell-RNTI (C-RNTI) for a grant-based initial transmission or retransmission of the grant-based initial transmission.

At step 504, the UE may perform a GF UL transmission. The UE may perform the GF UL transmission without waiting for a downlink control information (DCI) signal.

In some embodiments, the UE may detect the DCI signal in a search space of a physical downlink control channel (PDCCH) using the GF-RNTI. The DCI signal may comprise information about a retransmission related to the GF transmission. The DCI signal may also comprise GF specific configuration parameters. The UE may detect the DCI signal in the search space of the PDCCH using the GF-RNTI by descrambling a cyclic redundancy check (CRC) of the DCI signal in accordance with the GF-RNTI and performing a CRC check of the DCI signal using the descrambled CRC.

In some embodiments, the UE may perform the GF UL transmission in response to the receiving the RRC signal and before detection of the DCI signal. In some embodiments, before receiving the RRC, the UE may perform initial access by sending a preamble through a random access (RA) channel (RACH).

FIG. 6 illustrates an exemplary flowchart of an embodiment method 600 grant-free (GF) uplink (UL) transmissions by a user equipment (UE) in a group of UEs. Method 600 starts at step 602, where a UE may receive a Radio Resource Control (RRC) signal. The RRC signal may specify a GF group Radio Network Temporary Identifier (RNTI) and a UE index. The GF group RNTI may be commonly shared by the group of UEs. The UE index may be assigned to the UE. Further, the UE index may be different from the UE indices assigned to other UEs in the group of UEs.

At step 604, the UE may receive a multicast signal. The multicast signal may specify at least frequency resources and Modulation and Coding Scheme (MCS) to be shared by the UEs in the group. In some embodiments, the multicast signal may be a group common downlink control information (DCI) signal addressed to the group of UEs sharing the GF group RNTI. The GF group RNTI may be used for scrambling a cyclic redundancy check (CRC) of the group common DCI.

At step 606, the UE may perform GF UL transmissions. The UE may perform GF UL transmissions in accordance with the GF group RNTI, the UE index, the frequency resources, and the MCS.

In some embodiments, the UE may determine a reference signal in accordance to the UE index. In those embodiments, the UE may perform the GF UL transmissions in accordance with the determined reference signal, the GF group RNTI, the frequency resources, and the MCS. The reference signal may be determined based on a currently configured reference signal, the UE index, and a total number of available reference signals.

In some embodiments, the UE may determine a hopping pattern based the UE index. The UE may perform the GF UL transmissions in accordance with the GF group RNTI, the UE index, the frequency resources, the MCS, and the determined hopping pattern. The determined hopping pattern of the UE may be different from hopping patterns of other UEs in the group of UEs.

In some embodiments, the UE may receive a UE-specific RRC signal. The UE specific RRC signal may specify a periodicity. The UE may perform the GF UL transmissions in accordance with the GF group RNTI, the UE index, the frequency resources, the MCS, and the periodicity.

Figure 7:
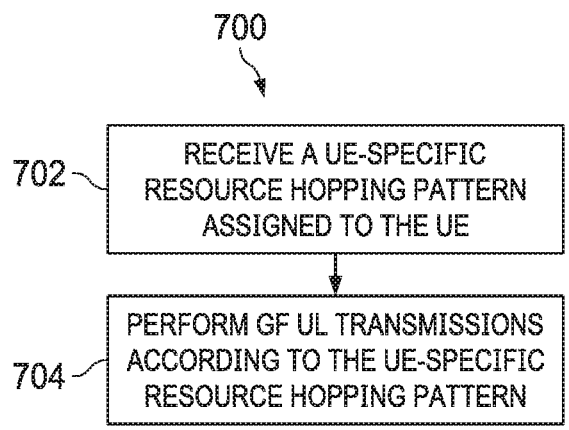
FIG. 7 is an exemplary flowchart for grant-free (GF) uplink (UL) transmissions.

FIG. 7 illustrates an exemplary flowchart of an embodiment method 700 for grant-free (GF) uplink (UL) transmissions. Method 700 starts at step 702, where a user equipment (UE) may receive a UE-specific resource hopping pattern assigned to the UE. The UE-specific resource hopping pattern may comprise hopping information. The hopping information may be associated with a sub-band that the UE hops to at each corresponding time slot of a plurality of time slots.

In some embodiments, the hopping information may indicate the sub-band that the UE hops to at each corresponding time slot of the plurality of time slots. The hopping information may comprise a UE-specific cyclic shift value. The UE-specific cyclic shift value may indicate a number of sub-bands to be cyclically shifted by the UE from one time slot to a next time slot.

At step 704, the UE may perform GF UL transmissions according to the UE-specific resource hopping pattern. In some embodiments, the sub-band that the UE hops to at each corresponding time slot may be determined based on the UE-specific cyclic shift value. In one embodiment, the sub-band that the UE hops to at each corresponding time slot may be determined based on the UE-specific cyclic shift value and an initial sub-band for the UE. In another embodiment, the sub-band that the UE hops to at each corresponding time slot may be determined based on a UE identifier. For example, the sub-band that the UE hops to at each corresponding time slot may be determined based on a UE-specific pseudo random sequence initialized by the UE identifier. In some embodiments, the UE identifier may be a UE-specific GF radio network temporary identifier (GF-RNTI). In yet another embodiment, the sub-band that the UE hops to at each corresponding time slot may be determined based on a UE-specific hopping index assigned to the UE.

In some embodiments, the sub-band that the UE hops to at each corresponding time slot may be determined based on a UE-specific cyclic shift value derived from the UE-specific hopping index and an initial sub-band for the UE derived from the UE-specific hopping index. In some embodiments, the sub-band that the UE hops to at each corresponding time slot may be determined based on an identifier of a group of UEs. For example, the sub-band that the UE hops to at each corresponding time slot may be determined based on a group-specific pseudo random sequence initialized by the identifier of the group of UEs. In one embodiment, the identifier of the group of UEs may be a group Radio Network Temporary Identifier (RNTI). In another embodiment, the identifier of the group of UEs is determined based on a UE-specific hopping index.

In some embodiments, the UE may determine a reference signal based on a UE-specific hopping index.

In some embodiments, to perform the GF UL transmissions, the UE may determine a sub-band the UE hops to at a time slot based on the hopping information. Next, the UE may derive a physical resource block (PRB) index at the time slot in accordance with the determined sub-band, a total number of resource blocks (RBs) in the determined sub-band, and a total number of RBs assigned to the GF transmissions. Then, the UE may perform the GF UL transmissions at the time slot in accordance to the derived PRB index.

In accordance with an embodiment of the present disclosure, a method for grant-free resource configuration includes configuring a first type of grant-free resource, wherein the first type of grant-free resource is cell-specific and is configured using broadcast signaling, and wherein the first type of grant-free resource is accessible to a UE without further configuration; and configuring a second type of grant-free resource, wherein the second type of grant-free resource is UE-specific and is configured using a combination of broadcast signaling and unicast/multicast signaling, and wherein the second type of grant-free resource is accessible to a UE only after the configuration using unicast/multicast signaling.

In accordance with an embodiment of the present disclosure, a method for configuring grant-free resources for a UE includes indicating a first time and frequency location of the grant-free resources in a first TTI; and indicating a resource hopping pattern, wherein the resource hopping pattern indicates a pattern according to which the UE is to move to different time and frequency locations in subsequent TTIs.

In accordance with an embodiment of the present disclosure, a method for configuring a grant-free resource allocation to a group of UEs includes configuring time and frequency resources for one TTI commonly for all UEs in the group; configuring a reference signal and a resource hopping pattern as a function of a UE index in the group; and multicasting the grant-free resource allocation to the group, wherein the grant-free resource allocation includes the time and frequency resources, reference signal parameters, and an MCS to be used by the UEs in the group.

In accordance with an embodiment of the present disclosure, a method for grant-free transmission includes repeating a grant-free transmission a defined first number of times, wherein the defined first number of times is based on a value of at least one parameter associated with a UE making the grant-free transmission.

Figure 8:
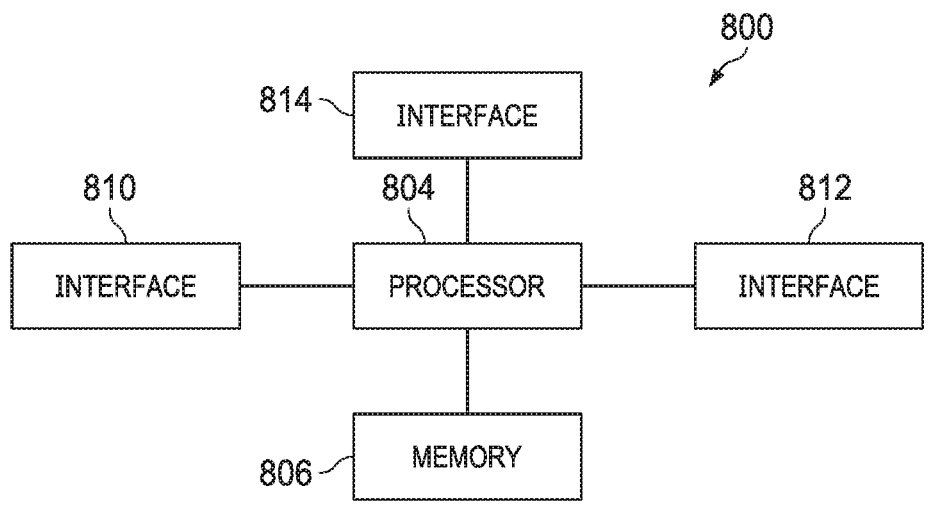
FIG. 8 is a block diagram of an embodiment processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in the figure. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a UE. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in the figure, such as long term storage (e.g., non-volatile memory, etc.).

In some embodiments, the processing system 800 is included in a network device that is accessing, or part otherwise of, a telecommunications netwo900rk. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
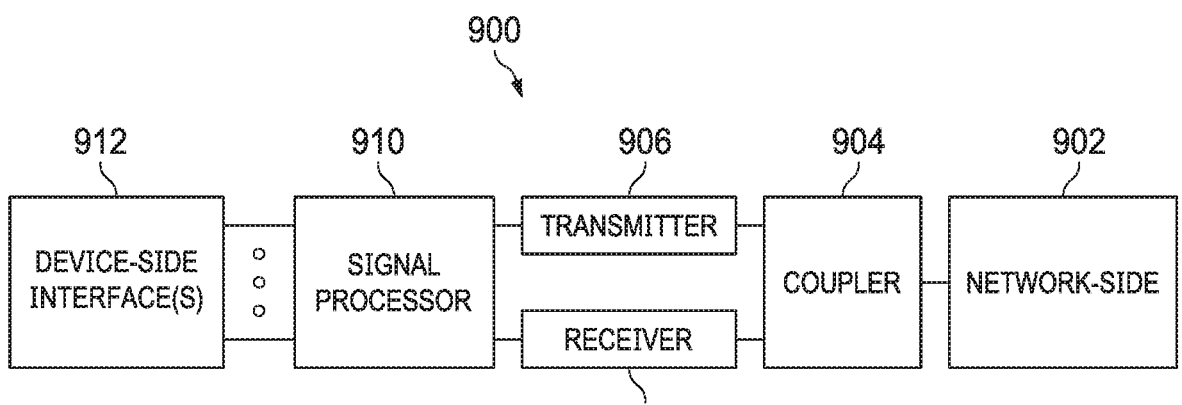
FIG. 9 is a block diagram of a transceiver adapted to transmit and receive signaling over a telecommunications network.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 600 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module and/or an indicating unit/module. The respective units/modules may be hardware, software, or a combination thereof. For instance, one or more of the units/modules may be an integrated circuit, such as field programmable gate arrays (FPGAs) or application-specific integrated circuits (ASICs).

In one example embodiment for grant-free (GF) uplink (UL) transmissions by a user equipment (UE) in a group of UEs, the UE receives a Radio Resource Control (RRC) signal specifying a GF group Radio Network Temporary Identifier (RNTI) and a UE index. The GF group RNTI may be used for scrambling a cyclic redundancy check (CRC) of the group common DCI. The GF group RNTI is commonly shared by the group of UEs, and the UE index is assigned to the UE. The UE index is different from UE indices assigned to other UEs in the group of UEs.

Then, the UE receives a multicast signal specifying at least frequency resources and a Modulation and Coding Scheme (MCS) to be shared by the UEs in the group. The multicast signal may be a group common downlink control information (DCI) signal addressed to the group of UEs sharing the GF group RNTI.

Next, the UE performs GF UL transmissions in accordance with the GF group RNTI, the UE index, the frequency resources, and the MCS. The UE may perform the GF UL transmissions by determining a reference signal in accordance to the UE index and performing the GF UL transmissions in accordance with the determined reference signal, the GF group RNTI, the frequency resources, and the MCS. The reference signal may be determined based on a currently configured reference signal, the UE index, and a total number of available reference signals.

Further, the UE may determine a hopping pattern based the UE index. The hopping pattern of the UE is different from hopping patterns of other UEs in the group. The UE may perform the GF UL transmissions in accordance with the GF group RNTI, the UE index, the frequency resources, the MCS, and the determined hopping pattern.

The UE may also receive a UE-specific RRC signal specifying a periodicity. The UE may perform the GF UL transmissions in accordance with the GF group RNTI, the UE index, the frequency resources, the MCS, and the periodicity.

In one example embodiment for grant-free (GF) uplink (UL) transmissions, a UE receives a UE-specific resource hopping pattern assigned to the UE. The UE-specific resource hopping pattern comprises hopping information associated with a sub-band the UE hops to at each corresponding time slot of a plurality of time slots. The hopping information indicates the sub-band that the UE hops to at each corresponding time slot of the plurality of time slots.

The hopping information comprises a UE-specific cyclic shift value indicating a number of sub-bands to be cyclically shifted by the UE from one time slot to a next time slot, and the sub-band that the UE hops to at each corresponding time slot is determined based on the UE-specific cyclic shift value.

The sub-band that the UE hops to at each corresponding time slot may be determined based on the UE-specific cyclic shift value and an initial sub-band for the UE. The sub-band that the UE hops to at each corresponding time slot may be determined based on a UE identifier. The sub-band that the UE hops to at each corresponding time slot may be determined based on a UE-specific pseudo random sequence initialized by the UE identifier. The UE identifier may be a UE-specific GF radio network temporary identifier (GF-RNTI). The sub-band that the UE hops to at each corresponding time slot may be determined based on a UE-specific hopping index assigned to the UE. The sub-band that the UE hops to at each corresponding time slot is determined based on a UE-specific cyclic shift value derived from the UE-specific hopping index and an initial sub-band for the UE derived from the UE-specific hopping index. The sub-band that the UE hops to at each corresponding time slot is determined based on an identifier of a group of UEs. The sub-band that the UE hops to at each corresponding time slot is determined based on a group-specific pseudo random sequence initialized by the identifier of the group of UEs. The identifier of the group of UEs may be a group Radio Network Temporary Identifier (RNTI). The identifier of the group of UEs is determined based on a UE-specific hopping index.

Next, the UE performs GF UL transmissions according to the UE-specific resource hopping pattern. The UE may determine a sub-band the UE hops to at a time slot based on the hopping information. The UE may derive a physical resource block (PRB) index at the time slot in accordance with the determined sub-band, a total number of resource blocks (RBs) in the determined sub-band, and a total number of RBs assigned to the GF transmissions. Then, the UE performs the GF UL transmissions at the time slot in accordance to the derived PRB index. The UE may also determine a reference signal based on a UE-specific hopping index.

Although the embodiments have been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method comprising:
   receiving, by a user equipment (UE), signaling from a base station (BS), the signaling including a radio resource control (RRC) signaling, wherein the signaling indicates a UE-specific hopping parameter; and
   performing, by the UE, an uplink data transmission based on the UE-specific hopping parameter,
   wherein the UE-specific hopping parameter explicitly indicates a corresponding number of resource blocks (RBs) to be cyclically shifted relative to an assigned RB to derive a corresponding starting RB for each of a plurality of uplink data transmissions performed at a corresponding time period of a plurality of time periods, the plurality of uplink data transmissions including the uplink data transmission.

2. The method of claim 1, wherein the performing the uplink data transmission comprises:
   performing a grant free (GF) uplink data transmission without dynamic grant.

3. The method of claim 1, wherein the RRC signaling further indicates an initial frequency location.

4. The method of claim 1, wherein the corresponding number of RBs to be offset is a cyclical frequency shift from one time period to a next time period.

5. The method of claim 1, wherein the UE-specific hopping parameter is applicable to multi-slot physical uplink shared channel (PUSCH) transmission.

6. The method of claim 5, wherein the UE-specific hopping parameter is applicable to single-slot physical uplink shared channel (PUSCH) transmission.

7. The method of claim 1, wherein the assigned RB is a virtual RB (VRB) or a physical RB (PRB).

8. The method of claim 1, wherein the signaling further indicates a second UE-specific hopping parameter indicating a periodicity of a hopping pattern corresponding the UE-specific hopping parameter.

9. An apparatus comprising:
   a memory storage comprising instructions; and
   one or more processors in communication with the memory storage, wherein the one or more processors execute the instructions to cause the apparatus to:
      receive signaling from a base station (BS), the signaling including a radio resource control (RRC) signaling, wherein the signaling indicates a user equipment (UE)-specific hopping parameter; and
      perform an uplink data transmission based on the UE-specific hopping parameter,
      wherein the UE-specific hopping parameter explicitly indicates a corresponding number of resource blocks (RBs) to be cyclically shifted relative to an assigned RB to derive a corresponding starting RB for each of a plurality of uplink data transmissions performed at a corresponding time period of a plurality of time periods, the plurality of uplink data transmissions including the uplink data transmission.

10. The apparatus of claim 9, the instructions to perform the uplink data transmission comprise instructions to:
   perform a grant free (GF) uplink data transmission without dynamic grant.

11. The apparatus of claim 9, wherein the RRC signaling further indicates an initial frequency location.

12. The apparatus of claim 9, wherein the corresponding number of RBs to be offset is a cyclical frequency shift from one time period to a next time period.

13. The apparatus of claim 9, wherein the UE-specific hopping parameter is applicable to multi-slot physical uplink shared channel (PUSCH) transmission.

14. The apparatus of claim 13, wherein the UE-specific hopping parameter is applicable to single-slot physical uplink shared channel (PUSCH) transmission.

15. The apparatus of claim 9, wherein the assigned RB is a virtual RB (VRB) or a physical RB (PRB).

16. The apparatus of claim 9, wherein the apparatus is a user equipment (UE).

17. A method comprising:
   transmitting, by a base station to a user equipment (UE), signaling, the signaling including a radio resource control (RRC) signaling, wherein the signaling indicates a UE-specific hopping parameter; and
   receiving, by the base station, an uplink data transmission based on the UE-specific hopping parameter, wherein the UE-specific hopping parameter explicitly indicates a corresponding number of resource blocks (RBs) to be cyclically shifted relative to an assigned RB to derive a corresponding starting RB for each of a plurality of uplink data transmissions performed at a corresponding time period of a plurality of time periods, the plurality of uplink data transmissions including the uplink data transmission.

18. The method of claim 17, wherein the receiving the uplink data transmission comprises:
   receiving a grant free (GF) uplink data transmission without dynamic grant.

19. An apparatus comprising:
   a memory storage comprising instructions; and
   one or more processors in communication with the memory storage, wherein the one or more processors execute the instructions to cause the apparatus to:
      transmit, to a user equipment (UE), signaling, the signaling including a radio resource control (RRC) signaling, wherein the signaling indicates a UE-specific hopping parameter; and
      receiving an uplink data transmission based on the UE-specific hopping parameter,
      wherein the UE-specific hopping parameter explicitly indicates a corresponding number of resource blocks (RBs) to be cyclically shifted relative to an assigned RB to derive a corresponding starting RB for each of a plurality of uplink data transmissions performed at a corresponding time period of a plurality of time periods, the plurality of uplink data transmissions including the uplink data transmission.

* * * * *